(12) United States Patent
Nishibashi et al.

(10) Patent No.: US 8,306,730 B2
(45) Date of Patent: Nov. 6, 2012

(54) NAVIGATION SYSTEM

(75) Inventors: Kumi Nishibashi, Tokyo (JP); Takashi Irie, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/067,333

(22) Filed: May 25, 2011

(65) Prior Publication Data

US 2011/0288761 A1 Nov. 24, 2011

Related U.S. Application Data

(63) Continuation of application No. 13/131,134, filed as application No. PCT/JP2009/005743 on Oct. 29, 2009.

(30) Foreign Application Priority Data

Nov. 28, 2008 (JP) .................. 2008-304932

(51) Int. Cl.
*G21C 21/26* (2006.01)
(52) U.S. Cl. ........................................ 701/400
(58) Field of Classification Search .......... 701/200–202, 701/400; 707/920
See application file for complete search history.

(56) References Cited

U.S. PATENT DOCUMENTS

| | | | |
|---|---|---|---|
| 6,295,503 B1 | 9/2001 | Inoue et al. | |
| 7,433,780 B2 * | 10/2008 | Machino | 701/202 |
| 7,979,201 B2 * | 7/2011 | Machino | 701/201 |
| 8,024,115 B2 * | 9/2011 | Hayashida et al. | 701/210 |
| 8,050,859 B2 * | 11/2011 | Machino | 701/202 |
| 2001/0021895 A1 | 9/2001 | Yamazaki | |
| 2005/0055158 A1 | 3/2005 | Machino | |
| 2005/0071080 A1 | 3/2005 | Sano | |
| 2005/0288855 A1 | 12/2005 | Sano | |
| 2007/0050134 A1 | 3/2007 | Hayashida et al. | |
| 2007/0073455 A1 | 3/2007 | Oyobe et al. | |
| 2008/0249710 A1 | 10/2008 | Takada | |
| 2008/0288163 A1 | 11/2008 | Asano | |
| 2009/0306842 A1 | 12/2009 | Oyobe et al. | |
| 2010/0094549 A1 | 4/2010 | Machino | |

FOREIGN PATENT DOCUMENTS

| | | |
|---|---|---|
| JP | 9-329454 A | 12/1997 |
| JP | 10-141975 A | 5/1998 |
| JP | 11-245745 A | 9/1999 |
| JP | 2001-118197 A | 4/2001 |
| JP | 2001-183159 A | 7/2001 |
| JP | 2004-268644 A | 9/2004 |
| JP | 2005-61988 A | 3/2005 |
| JP | 2005-83758 A | 3/2005 |
| JP | 2006-10504 A | 1/2006 |
| JP | 2007-86052 A | 4/2007 |
| JP | 2007-94867 A | 4/2007 |
| JP | 3908425 B2 | 4/2007 |
| JP | 2008-256593 A | 10/2008 |
| JP | 2008-286671 A | 11/2008 |
| WO | WO 2008/096485 A1 | 8/2008 |

\* cited by examiner

*Primary Examiner* — Yonel Beaulieu

(74) *Attorney, Agent, or Firm* — Birch, Stewart, Kolasch & Birch, LLP

(57) ABSTRACT

A navigation system includes: a map information acquiring unit for acquiring map information; an HOV lane decision unit for deciding whether an HOV lane is included in a road represented by the map information acquired by the map information acquiring unit or not; a road number processing unit for performing, when the HOV lane decision unit decides that the HOV lane is included, processing of adding information representing the HOV lane to a road number of the road including the HOV lane; and a display processing unit or a voice information unit for causing the road number passing through the processing by the road number processing unit to be displayed on the guide map or output in voice.

2 Claims, 26 Drawing Sheets

Road Number of HOV Lane

Road Number of HOV Lane

FIG.8

Prefixes of Road Numbers

| Types | Strings |
|---|---|
| Interstate | I- |
| Federal | US- |
| State | AL- |
| | AK- |
| | AZ- |
| | CA- |
| | ⋮ |
| County | CR- |
| | ⋮ |

Remaining Distance or Remaining Time

Guide Section Mark —

No Entry Road

No Entry Mark

No Entry Mark

FIG.26
(a)
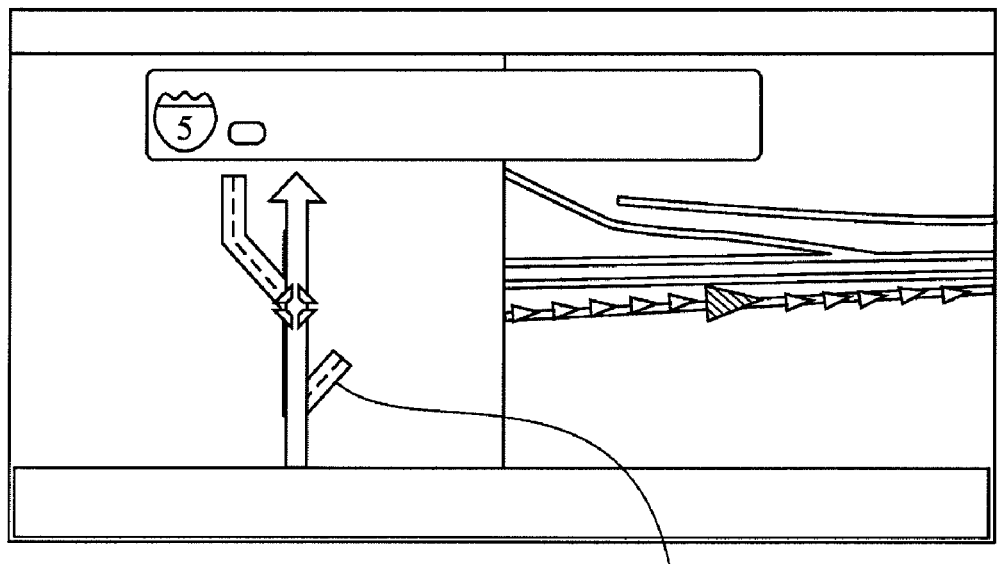
HOV Lane
(b)
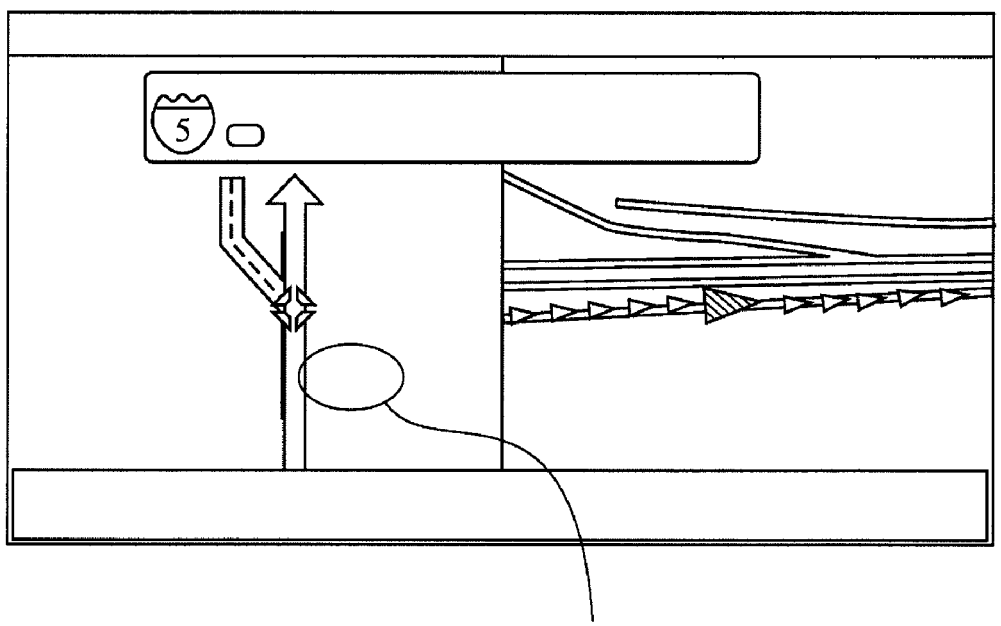
HOV Lane is not Shown

NAVIGATION SYSTEM

This application is a Continuation of co-pending U.S. application Ser. No. 13/131,134, filed on May 25, 2011. U.S. application Ser. No. 13/131,134 is the national phase of International Application No. PCT/JP2009/005743, filed on Oct. 29, 2009, which claims the benefit of priority to Application No. 2008-304932 filed in Japan on Nov. 28, 2008. The entire contents and disclosure of the above-referenced applications are all hereby incorporated by reference.

TECHNICAL FIELD

The present invention relates to a navigation system for guiding a user to a destination, and particularly to a technique for guiding while taking an HOV lane (High Occupancy Vehicle Lane) into account.

BACKGROUND ART

Conventionally, as a road that regulates entrance of vehicles, a carpool lane has been known which is employed by a road system mainly seen in large cities in North America. The carpool lane, which is also called an HOV lane, is a lane that allows only vehicles with two or more passengers to travel. As an example of the carpool lane, a lane provided on a highway, a lane that short-cuts an interchange and the like are known. A road system that employs the carpool lane encourages a plurality of passengers to get on the same vehicle by giving preferential treatment to them of being able to arrive at a destination in a shorter time by driving along the carpool lane, thereby trying to reduce a volume of traffic to alleviate traffic congestion.

As a technique for guiding along the carpool lane, Patent Document 1 discloses a navigation system that enables driving along a lane efficiently which limits changing to or from other lanes. The navigation system reads from a DVD map data containing road information on an entrance/exit point on an express highway provided with a carpool lane, and stores in a data buffer. Using the map data stored in the data buffer, a route search processing unit performs route search processing considering whether the carpool lane can be used. To carry out route guidance using the carpool lane, a carpool lane guiding unit gives prescribed lane change information using images and voices at timing when an entrance/exit point at which the route is to be changed comes within a prescribed distance from the position of the vehicle.

PRIOR ART DOCUMENT

Patent Document

Patent Document 1: Japanese Patent Laid-Open No. 2001-183159.

DISCLOSURE OF THE INVENTION

However, the conventional technology disclosed in the foregoing Patent Document 1 does not give information about the road number while taking an HOV lane into account, information about the remaining distance and remaining time as to the driving HOV lane, or information for displaying an entrance/exit section in a single link, thereby offering a problem in that a user cannot drive along the HOV lane comfortably.

The present invention is implemented to solve the foregoing problems. Therefore it is an object of the present invention to provide a navigation system capable of guiding a user through an HOV lane comfortably.

To solve the foregoing problems, a navigation system in accordance with the present invention includes: a map information acquiring unit for acquiring map information; an HOV lane decision unit for deciding whether an HOV lane is included in a road represented by the map information acquired by the map information acquiring unit or not; and a control unit for checking, when the HOV lane decision unit decides that the HOV lane is included, whether a branch road diverging only from an ordinary lane is located in a route section passing through the HOV lane or not on a basis of the map information acquired by the map information acquiring unit, and for suppressing guidance of the branch road when a decision is made that the branch road is located.

According to the navigation system in accordance with the present invention, as for the branch road connected to the ordinary lane, since it is impossible to enter the branch road during traveling in the HOV lane, it can suppress giving information unnecessary for a user since the information representing the HOV lane is added to the road number and is displayed during traveling in the HOV lane, it can cause a user to visually recognize in which road and where on the road the user is driving. As a result, it can give information that will enable the user to drive comfortably in the HOV lane.

BRIEF DESCRIPTION OF THE DRAWINGS

FIG. 8 is a diagram showing processing of extracting the road number from a road name, which is carried out by the navigation system of the embodiment 2 in accordance with the present invention;

FIG. 26 is a diagram showing an example of a guide map displayed in the navigation system of the embodiment 13 in accordance with the present invention;

BEST MODE FOR CARRYING OUT THE INVENTION

The best mode for carrying out the invention will now be described with reference to the accompanying drawings to explain the present invention in more detail.

Embodiment 1

A navigation system of an embodiment 1 in accordance with the present invention is configured in such a manner as to add information representing an HOV lane to a road number display during traveling in the HOV lane.

Figure 1:
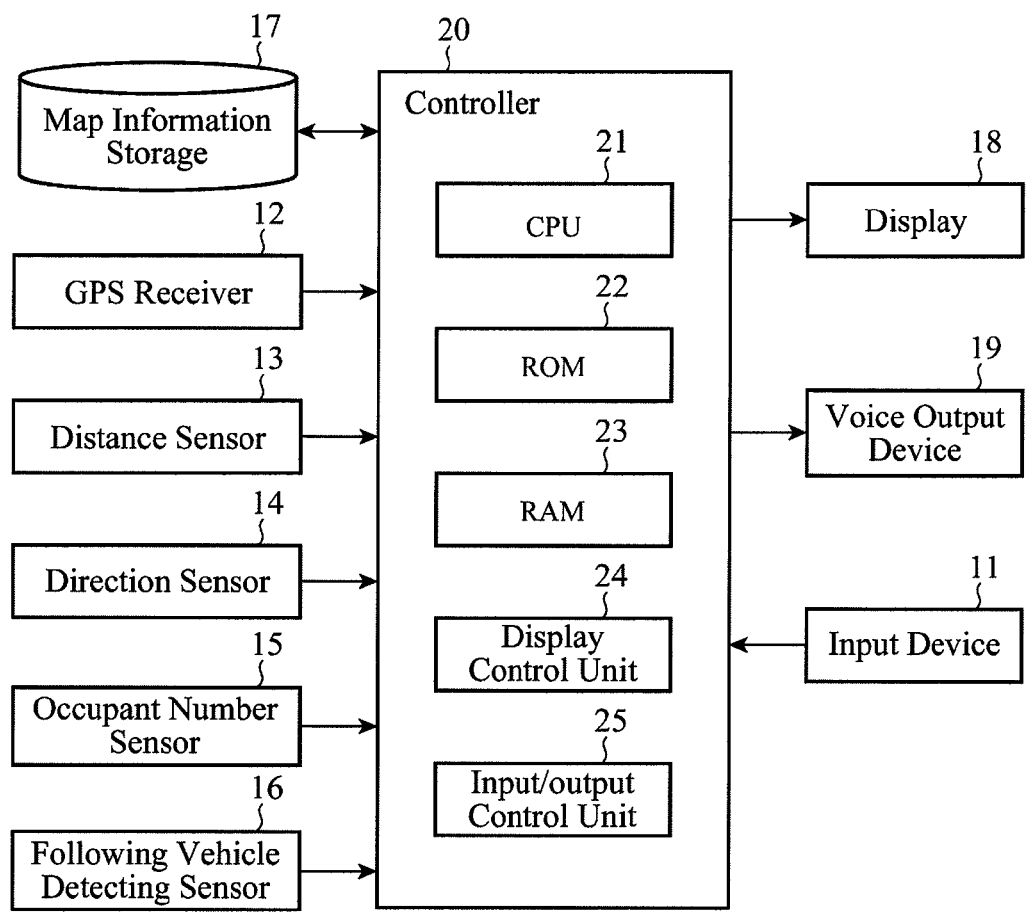
FIG. 1 is a block diagram showing a hardware configuration of a navigation system of an embodiment 1 in accordance with the present invention.

FIG. 1 is a block diagram showing a hardware configuration of the navigation system of the embodiment 1 in accordance with the present invention. The navigation system comprises an input device 11, a GPS (Global Positioning System) receiver 12, a distance sensor 13, a direction sensor 14, an occupant number sensor 15, a following vehicle detecting sensor 16, a map information storage 17, a display 18, a voice output device 19 and a controller 20.

The input device 11 comprises a touch panel mounted on the screen of the display 18, for example. The input device 11 is used for inputting a starting place, a destination or places passed through for a route search, or used for a user to provide the navigation system with a variety of instructions. The information input from the input device 11 is delivered to the controller 20 as an operating signal.

The GPS receiver 12 detects the current position of the vehicle from GPS signals received from GPS satellites. The current position of the vehicle detected by the GPS receiver 12 is delivered to the controller 20 as a current position signal. The distance sensor 13 detects the distance covered by the vehicle. The distance covered detected with the distance sensor 13 is delivered to the controller 20 as a distance signal. The direction sensor 14 detects the direction in which the vehicle faces. The direction detected with the direction sensor 14 is delivered to the controller 20 as a direction signal.

The map information storage 17, which is constructed of an HDD (Hard Disk Drive) system, for example, stores not only digitized map information containing road data that define roads with links and nodes, but also various data for achieving navigation functions. Incidentally, the map information storage 17 can be constructed not only of the HDD, but also of a drive for reading data from a DVD (Digital Versatile Disk), CD (Compact Disk), memory stick or SD memory card, which are loaded.

A road represented by the road data contained in the map information is defined by a single link regardless of whether an HOV lane is juxtaposed on the road or not. The link data representing a link includes HOV lane position information indicating the position of an HOV lane, HOV lane presence/absence information representing whether an HOV lane is juxtaposed or not, lane change enabled position information representing a position at which a lane change is allowed between the HOV lane and another lane, time regulation information representing a passable/impassable state of the HOV lane entrance/exit with respect to time, and the road name and road number. The road name is a name given to the road. The road number is the number given to the road. The data stored in the map information storage 17 are read by the controller 20.

The occupant number sensor 15 detects the number of passengers in a vehicle. The number of the passengers detected with the occupant number sensor 15 is delivered to the controller 20 as an occupant number signal. The following vehicle detecting sensor 16 detects the presence/absence of a following vehicle in the lane which is adjacent to the current driving lane and to which the lane is to be changed. The presence/absence of the following vehicle detected with the following vehicle detecting sensor 16 is delivered to the controller 20 as a following vehicle signal.

The display 18, which is constructed of an LCD (Liquid Crystal Display), for example, displays a map, route, enlarged drawing, road number and various guiding messages on its screen in response to a video signal delivered from the controller 20. The voice output device 19, which consists of a speaker, for example, outputs guide information such as a road number, remaining distance or remaining time in voice in response to the voice signal delivered from the controller 20.

The controller 20 controls the whole navigation system as will be described in detail later. The controller 20 includes a CPU (Central Processing Unit) 21, a ROM (Read Only Memory) 22, a RAM (Random Access Memory) 23, a display control unit 24 and an input/output control unit 25.

The CPU 21, using the RAM 23 as a working memory, executes processing such as a route search or guide point extraction by operating according to programs read out of the ROM 22. The ROM 22 stores programs and data that are read by the CPU 21 for executing various steps. The RAM 23, which is used as the working memory of the CPU 21 as mentioned above, temporarily stores data during processing (such as developed map data).

The display control unit 24 controls the display 18. More specifically, it converts the display data created by the CPU 21 to the video signal, and delivers it to the display 18 via the input/output control unit 25. The input/output control unit 25, which functions as an interface between the controller 20 and the devices connected to it, that is, the input device 11, GPS receiver 12, distance sensor 13, direction sensor 14, occupant number sensor 15, following vehicle detecting sensor 16, map information storage 17, display 18 and voice output device 19, controls transfer of signals between them.

Figure 2:
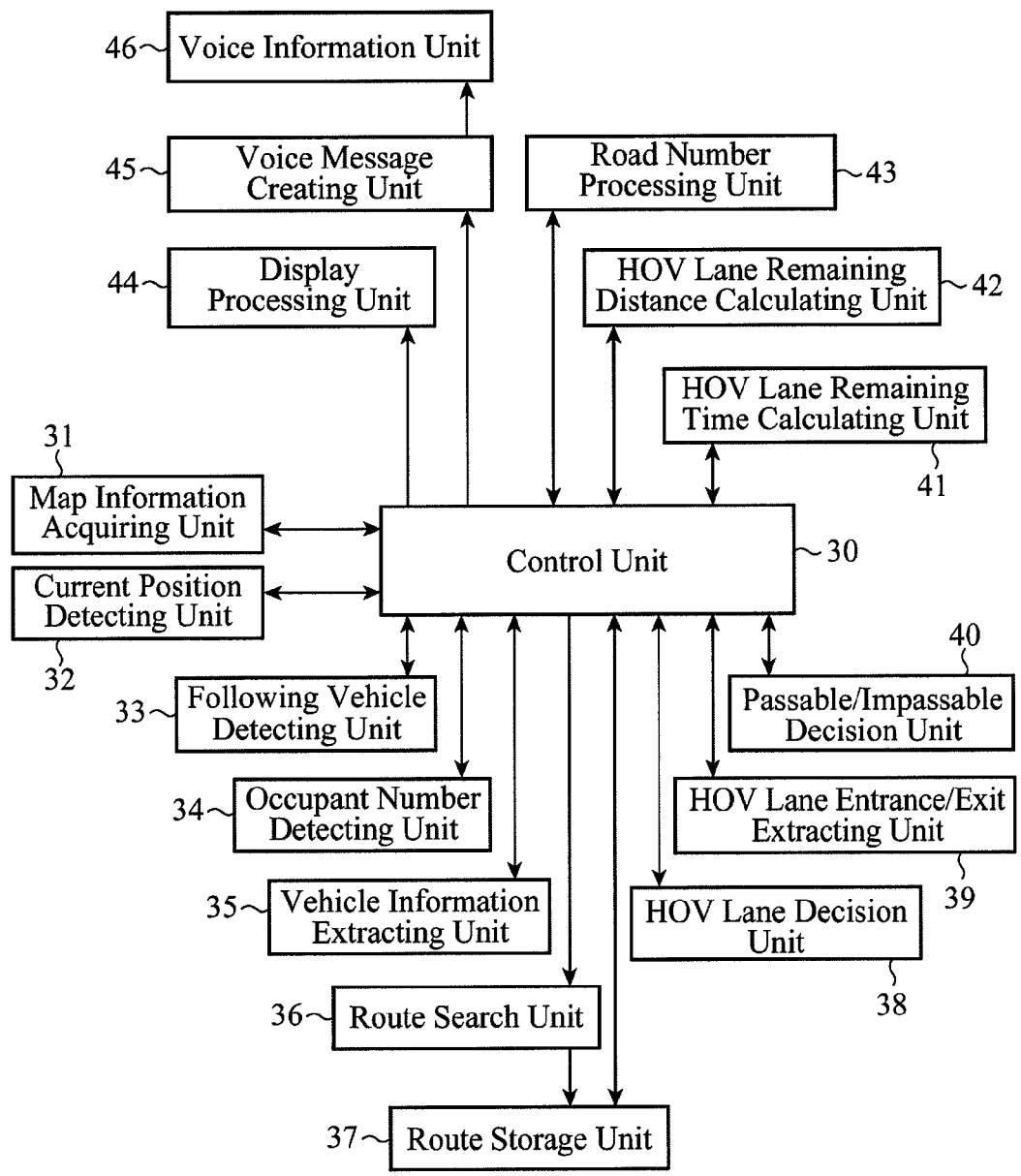
FIG. 2 is a functional block diagram showing a functional configuration of the controller of the navigation system of the embodiment 1 in accordance with the present invention.

Next, functions achieved by the controller 20 will be described in detail. FIG. 2 is a functional block diagram showing a functional configuration of the controller 20. The controller 20 includes a control unit 30, a map information acquiring unit 31, a current position detecting unit 32, a following vehicle detecting unit 33, an occupant number detecting unit 34, a vehicle information extracting unit 35, a route search unit 36, a route storage unit 37, an HOV lane decision unit 38, an HOV lane entrance/exit extracting unit 39, a passable/impassable decision unit 40, an HOV lane remaining time calculating unit 41, an HOV lane remaining distance calculating unit 42, a road number processing unit 43, a display processing unit 44, a voice message creating unit 45 and a voice information unit 46. Among these units, those other than the route storage 37 are implemented by program processing executed by the CPU 21.

The control unit 30 controls the controller 20 in its entirety. For example, the control unit 30 controls starting and stopping of the components connected thereto and data transfer between the components. The map information acquiring unit 31 acquires map information from the map information storage 17 and delivers to the control unit 30.

The current position detecting unit 32 detects the current position of the vehicle from the current position signal delivered from the GPS receiver 12 or the current position signal created by dead reckoning using the direction signal delivered from the direction sensor 14 and the distance signal delivered from the distance sensor 13, and the map information acquired from the map information acquiring unit 31 via the control unit 30. The current position detected by the current position detecting unit 32 is delivered to the control unit 30 as the current position information. Incidentally, since the data transfer between the components connected to the control unit 30 is all performed via the control unit 30, the description that it is performed via the control unit 30 will be omitted below.

Even as for a road represented by a single link on the navigation system, the current position detecting unit 32 can detect in which lane of the single link it is traveling. The current position of the vehicle detected by the current position detecting unit 32 is delivered to the control unit 30 as vehicle position information.

The following vehicle detecting unit 33 detects the presence/absence of the following vehicle from the following vehicle signal delivered from the following vehicle detecting sensor 16. The presence/absence of the following vehicle detected by the following vehicle detecting unit 33 is delivered to the control unit 30 as following vehicle data. Incidentally, as for a technique of detecting the following vehicle, since it is widely known and is disclosed in Japanese Patent Laid-Open Nos. 2004-268644, 2001-118197 and 11-245745/1999, for example, see them as necessary.

The occupant number detecting unit 34 detects the number of passengers in the vehicle from the occupant number signal delivered from the occupant number sensor 15. The occupant number detected by the occupant number detecting unit 34 is delivered to the control unit 30 as occupant number data. Incidentally, as for a technique for detecting the occupant number, since it is well known and is disclosed in Japanese Patent No. 3918326 and Japanese Patent Laid-Open No. 2005-061988, for example, see them as necessary.

The vehicle information extracting unit 35 extracts, from the vehicle in which the navigation system is mounted, vehicle information about the vehicle such as information indicating the size of the vehicle. The vehicle information extracted by the vehicle information extracting unit 35 is delivered to the control unit 30.

The route search unit 36 searches for a route from the current position indicated by the vehicle position information delivered from the current position detecting unit 32 or from the starting place input from the input device 11 to the destination input from the input device 11 on the basis of the map information acquired from the map information acquiring unit 31. The route searched by the route search unit 36 is delivered to the route storage unit 37 as route data.

The route storage unit 37 is located, for example, in a portion of the RAM 23 of the controller 20 to store the route data delivered from the route search unit 36. The route data stored in the route storage unit 37 are read by the control unit 30.

The HOV lane decision unit 38 decides as to whether the HOV lane is included in a road contained in the map information acquired from the map information acquiring unit 31 or in a route stored in the route storage unit 37. The decision result of the HOV lane decision unit 38 is delivered to the control unit 30.

When the decision result acquired from the HOV lane decision unit 38 indicates that the road or route includes the HOV lane, the HOV lane entrance/exit extracting unit 39 extracts an entrance/exit section between a lane other than the HOV lane and the HOV lane. The entrance/exit section extracted by the HOV lane entrance/exit extracting unit 39 is delivered to the control unit 30 as entrance/exit position data.

According to the number of passengers indicated by the occupant number data delivered from the occupant number detecting unit 34 and the vehicle information delivered from the vehicle information extracting unit 35, the passable/impassable decision unit 40 decides whether the HOV lane of the road or route, as to which the HOV lane decision unit 38 decides that it includes the HOV lane, is passable or not. The decision result by the passable/impassable decision unit 40 is delivered to the control unit 30.

The HOV lane remaining time calculating unit 41 calculates the remaining time of driving in the HOV lane of the road or route from the route data delivered from the route storage unit 37, the decision result delivered from the HOV lane decision unit 38, the entrance/exit position data delivered from the HOV lane entrance/exit extracting unit 39 and the vehicle position information delivered from the current position detecting unit 32. The remaining time calculated by the HOV lane remaining time calculating unit 41 is delivered to the control unit 30 as remaining time data.

The HOV lane remaining distance calculating unit 42 calculates the remaining distance of driving in the HOV lane of the road or route from the decision result delivered from the HOV lane decision unit 38, the entrance/exit position data delivered from the HOV lane entrance/exit extracting unit 39 and the vehicle position information delivered from the current position detecting unit 32. The remaining distance calculated by the HOV lane remaining distance calculating unit 42 is delivered to the control unit 30 as remaining distance data.

The road number processing unit 43 extracts the road number of the road on the map or on the route in which the vehicle travels from the map information delivered from the map information acquiring unit 31, the vehicle position information delivered from the current position detecting unit 32, the route data delivered from the route storage unit 37 and the decision result delivered from the HOV lane decision unit 38, and processes the road number extracted in such a manner as to be distinct as an HOV lane. The road number processed by the road number processing unit 43 delivered to the control unit 30 as an HOV lane information added road number.

The display processing unit 44 forms the display data for displaying on the display 18 the map expressed by the map information delivered from the map information acquiring unit 31, the route indicated by the route data delivered from the route storage unit 37, the road including the HOV lane indicated by the decision result delivered from the HOV lane decision unit 38, the entrance/exit position to the HOV lane indicated by the entrance/exit position data delivered from the HOV lane entrance/exit extracting unit 39, an impassable road indicated by the decision result delivered from the passable/impassable decision unit 40, the remaining time of driving in the HOV lane indicated by the remaining time data delivered from the HOV lane remaining time calculating unit 41, the remaining distance of driving in the HOV lane indicated by the remaining distance data delivered from the HOV lane remaining distance calculating unit 42, and the HOV lane information added road number delivered from the road number processing unit 43. The display data generated by the display processing unit 44 is delivered to the display control unit 24 within the controller 20.

The voice message creating unit 45 forms voice messages for informing of the remaining time of driving in the HOV lane indicated by the remaining time data delivered from the HOV lane remaining time calculating unit 41, the remaining distance of driving in the HOV lane indicated by the remaining distance data delivered from the HOV lane remaining distance calculating unit 42, the HOV lane information added road number delivered from the road number processing unit 43, the route indicated by the route data delivered from the route storage unit 37, the road including the HOV lane indicated by the decision result delivered from the HOV lane decision unit 38, and whether a lane change to and from the HOV lane is possible or not which is decided from the entrance/exit position to the HOV lane indicated by the entrance/exit position data delivered from the HOV lane entrance/exit extracting unit 39 and the presence/absence of the following vehicle indicated by the following vehicle data delivered from the following vehicle detecting unit 33. The voice messages generated by the voice message creating unit 45 are delivered to the voice information unit 46 as the voice data.

The voice information unit 46 converts the voice data delivered from the voice message creating unit 45 to a voice signal, and delivers to the voice output device 19. Thus, the voice information corresponding to the voice message is output from the voice output device 19.

Figure 3:
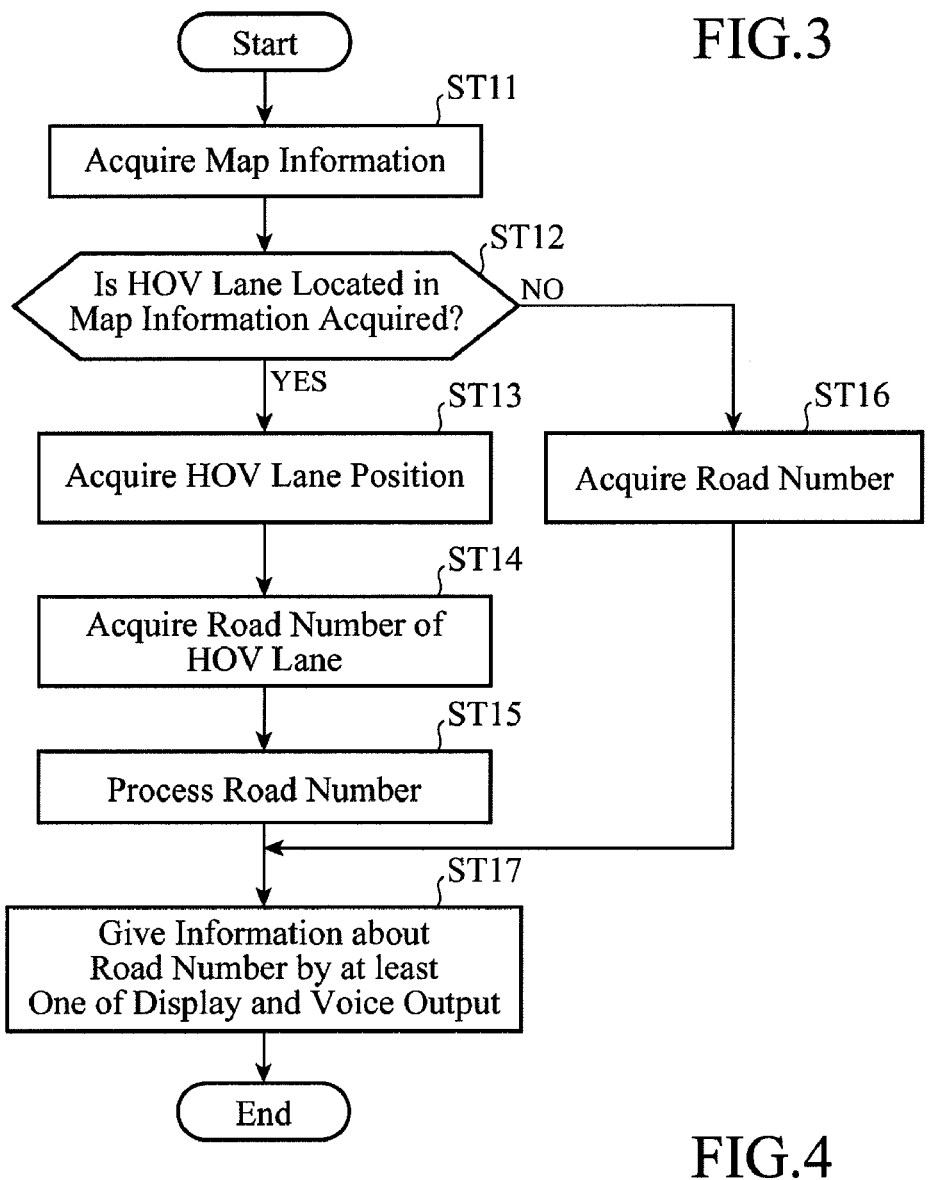
FIG. 3 is a flowchart showing the operation of the navigation system of the embodiment 1 in accordance with the present invention.

Next, the operation of the navigation system of the embodiment 1 in accordance with the present invention with the foregoing configuration will be described with reference to the flowchart shown in FIG. 3 centering on the road number information processing for guiding by adding to the road number the information indicating that it has an HOV lane.

In the road number information processing, the map information is acquired, first (step ST11). More specifically, the control unit 30 acquires the map information from the map information storage 17 via the map information acquiring unit 31, and delivers to the HOV lane decision unit 38. Subsequently, the map information acquired is checked whether it includes an HOV lane or not (step ST12). More specifically, the HOV lane decision unit 38 decides whether the road indicated by the map information delivered from the control unit 30 includes the HOV lane or not, and delivers the decision result to the control unit 30.

If a decision is made that the HOV lane is located at this step ST12, then the HOV lane position is acquired (step ST13). More specifically, when the decision result that the HOV lane is included is delivered from the HOV lane decision unit 38, the control unit 30 acquires the HOV lane position from the HOV lane position information in the link data corresponding to the road including the HOV lane.

Subsequently, the road number of the HOV lane is acquired (step ST14). More specifically, the control unit 30 acquires the road number of the link data corresponding to the road including the HOV lane and delivers to the road number processing unit 43. Subsequently, the road number is processed (step ST15). More specifically, the road number processing unit 43 processes the road number delivered from the control unit 30 in such a manner as to become distinct as the HOV lane, and delivers to the control unit 30 as the HOV lane information added road number. After that, the sequence proceeds to step ST17.

If a decision is made at the foregoing step ST12 that no HOV lane is located, then the road number is acquired (step ST16). More specifically, the control unit 30 acquires the road number of the link data corresponding to the road without an HOV lane. After that, the sequence proceeds to step ST17.

At step ST17, information is given through at least one of the road number display or voice output. More specifically, the control unit 30 delivers the HOV lane information added road number delivered from the road number processing unit 43 at step ST15 or the road number acquired at step ST16 to at least one of the display processing unit 44 and the voice message creating unit 45.

When receiving the HOV lane information added road number or road number from the control unit 30, the display processing unit 44 creates the display data to display it, and delivers to the display control unit 24 in the controller 20. The display control unit 24 converts the display data delivered from the display processing unit 44 to a video signal, and delivers to the display 18 via the input/output control unit 25. This enables the display 18 to display the HOV lane information added road number or road number on its screen.

Figure 4:
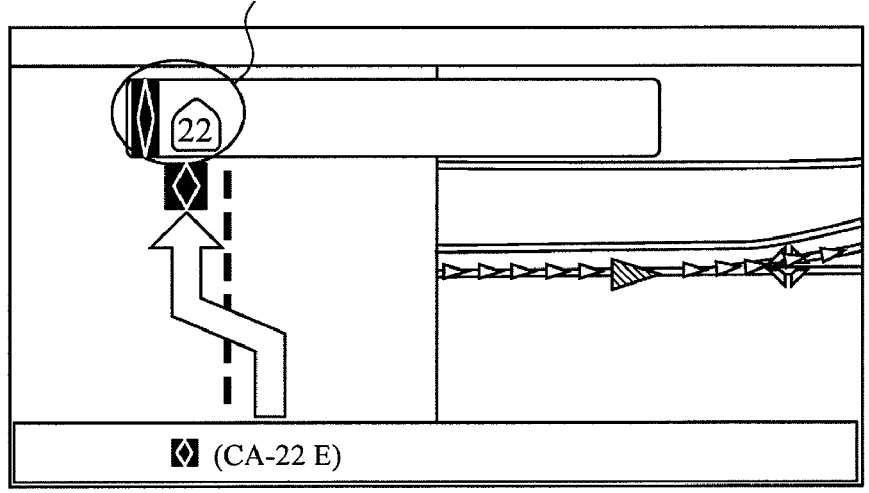
FIG. 4 is a diagram showing an example of an HOV lane information added road number displayed on the screen of a display of the navigation system of the embodiment 1 in accordance with the present invention.
Figure 5:
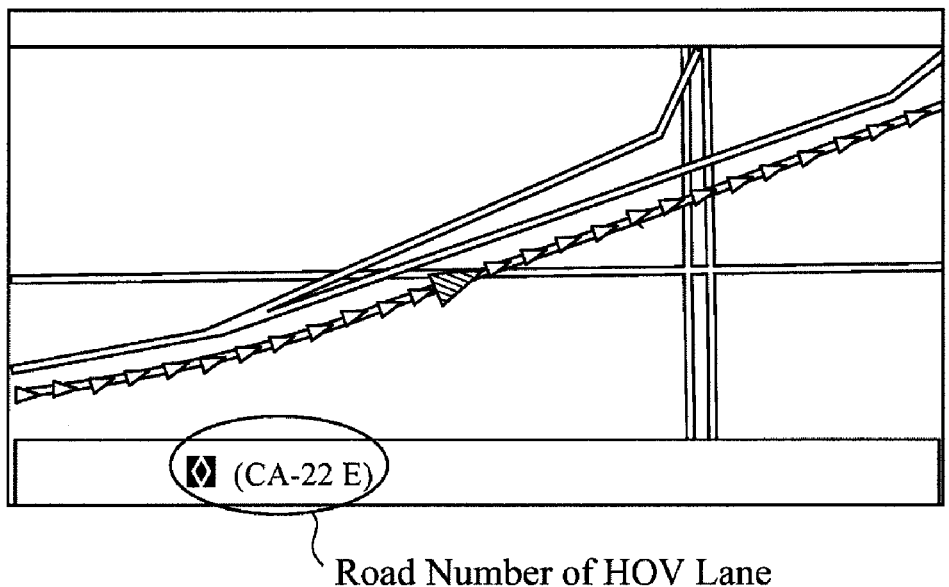
FIG. 5 is a diagram showing another example of an HOV lane information added road number displayed on the screen of the display of the navigation system of the embodiment 1 in accordance with the present invention.
Figure 6:
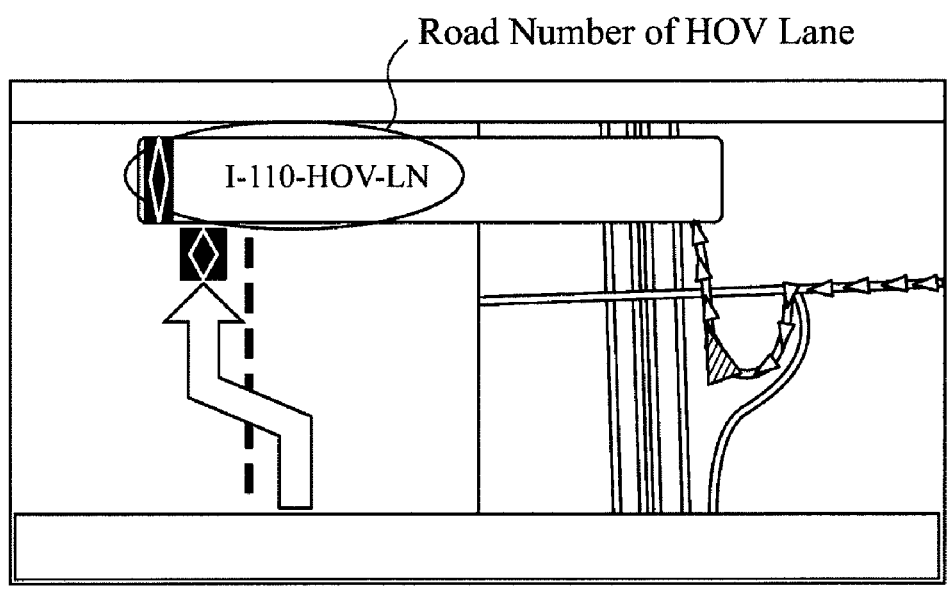
FIG. 6 is a diagram showing still another example of an HOV lane information added road number displayed on the screen of the display of the navigation system of the embodiment 1 in accordance with the present invention.

The HOV lane information added road number can be displayed in various modes that make it clear that it indicates the road number of the HOV lane. FIG. 4 to FIG. 6 are diagrams showing examples that display the HOV lane information added road number on the screen of the display 18. FIG. 4 is an example which displays the road number "22" with a mark (diamond shape) representing an HOV lane when displaying the road number in an information display area about a forward guide point.

FIG. 5 is an example which displays the road number "CA-22 E" with a mark (diamond shape) representing an HOV lane when displaying the road number in a current driving road information display area (at the bottom of the screen). FIG. 6 is an example which displays the road number "I-110-HOV-LN" to which "HOV-LN" representing an HOV lane is added when displaying the road number in the information display area of the forward guide point.

In addition, when the HOV lane information added road number or road number is delivered from the control unit 30, the voice message creating unit 45 forms a voice message for outputting them in voice, and delivers to the voice information unit 46 as voice data. The voice information unit 46 converts the voice data delivered from the voice message creating unit 45 to a voice signal, and delivers to the voice output device 19. This enables the voice output device 19 to output the voice information corresponding to the HOV lane information added road number or road number. After that, the road number information processing is terminated.

As described above, according to the navigation system of the embodiment 1 in accordance with the present invention, since it displays a string or figure representing the HOV lane in the road number display during driving in the HOV lane, it can cause a user to visually perceive in which road the user is driving. In addition, since the message indicating the HOV lane is added to the road number and is output in voice during driving in the HOV lane, it can cause the user to auditorily perceive in which road the user is driving.

Embodiment 2

The navigation system of an embodiment 2 in accordance with the present invention is configured in such a manner that while driving in the HOV lane, it adds information representing an HOV lane to a road number display and outputs, and that even if the link data representing a road does not contain the road number, in particular, it extracts the road number from the road name, adds the information representing the HOV lane to the road number it extracts, and displays it.

The configuration of the navigation system of the embodiment 2 in accordance with the present invention is the same as that of the navigation system of the foregoing embodiment 1. The following description will be made centering on differences (in operation) from the navigation system of the embodiment 1.

As for an HOV dedicated lane (HOV dedicated road), there are some cases where a link representing the road does not contain its road number, but contains only its road name. In addition, as for the road number, there are some cases where it is stored in the road name in the form like a road number.

The following are examples of storing formats of a road name and road number concerning an HOV lane.
   (a) HOV Dedicated Lane (HOV Dedicated Road)
     Example 1 (WEST SIDE of LOS ANGELES)
       Road Name: I-110-HOV-LN
       Road Number: Unavailable
     Example 2 (NORTHERN PART of LOS ANGELES)
       Road Name: BUS LN
       Road Number: Unavailable
     Example 3 (NORTHERN PART of I-95N)
       Road Name: Unavailable
       Road Number: I-395 HOV LN
   (b) Mixed Road of HOV Lane and FWY (Freeway) Lane
     Example 1 (EAST SIDE of LOS ANGELES)
       Road Name: Unavailable
       Road Number: I-110 N
     Example 2 (WEST SIDE of LOS ANGELES)
       Road Name: Unavailable
       Road Number: I-405 N
   (c) Road with Only FWY Lane
     Example 1 (NORTHERN PART of LOS ANGELES)
       Road Name: Unavailable
       Road Number: I-10 W
     Example 2
       Road Name: (EAST SIDE of BROOKLYN)
       Road Number: I-278 E Next, the road number information processing corresponding to the cases with the foregoing storage formats of the road names and road numbers will be described with reference to the flowchart of FIG. 7. Incidentally, as for the steps for executing the same or like processing to the processing shown in the flowchart of FIG. 3, they are designated by the same symbols as those of FIG. 3, and their description will be omitted for simplification.

In the road number information processing, the map information is acquired, first (step ST11). Subsequently, the map information acquired is checked whether it has an HOV lane or not (step ST12). At this step ST12, if a decision is made that the HOV lane is not located, then the road number is acquired (step ST16). After that, the sequence proceeds to step ST17.

If a decision is made at the foregoing step ST12 that the HOV lane is included, then the HOV lane position is acquired (step ST13). Subsequently, the road number of the HOV lane is acquired (step ST14). More specifically, the control unit 30 tries to acquire the road number of the link data corresponding to the road including the HOV lane.

Subsequently, it is checked whether the road number is stored or not (step ST21). More specifically, the control unit 30 checks whether the link data acquired at step ST14 contains the road number or not. If a decision is made at this step ST21 that the road number is contained, the control unit 30 delivers the road number to the road number processing unit 43. After that, the sequence proceeds to step ST17.

On the other hand, unless a decision is made at step ST21 that the road number is contained, then the road name of the HOV lane is acquired (step ST22). More specifically, the control unit 30 acquires the road name of the link data corresponding to the road including the HOV lane.

Subsequently, it is checked whether the road name contains the road number or not (step ST23). More specifically, the control unit 30 checks whether the road name contained in the link data acquired at step ST22 contains the road number or not. In the processing, the control unit 30 extracts the road number from the road name, first. An example of the processing of extracting the road number from the road name will be described.

First, a numeric part is cut out. More specifically, the string of the numeric part and its position are identified in the road name. Subsequently, the road number is identified. More specifically, a string at the preceding position of the numeric part cut out is checked whether it agrees with a string shown in FIG. 8 or not, for example, and when it agrees, the numeral is handled as a part of the road number. Unless it agrees, it is not handled as a part of the road number. Incidentally, the letters shown in FIG. 8 are prefixes making a pair with the numerals, and the road number consists of a combination of the numeral and the prefix. In the following, two concrete examples will be described.

For example, when the road name is "Freeway I-95", the numeric part "95" is cut out, first, followed by a decision that the numeral is located at 11th position and after. Subsequently, the string just before the 11th letter is decided whether it agrees with a string shown in FIG. 8 or not. In this case, since it agrees with "I-", "I-95" is extracted and decided as a road number.

For example, when the road name is "Freeway Exit5", the numeric part "5" is cut out, first, followed by a decision that the numeral is located at 13th position and after. Subsequently, the string just before the 13th letter is decided whether it agrees with a string shown in FIG. 8. In this case, since no string agrees, a decision is made that the road number is not present.

If a decision is made at the foregoing step ST23 that the road name does not contain the road number, the road number cannot be acquired. Thus, the road number information processing is terminated without guidance of the road number. On the other hand, if a decision is made at step ST23 that the road name contains the road number, the sequence proceeds to step ST17.

At step ST17, information is given by means of at least one of the display and voice output of the road number. More specifically, the control unit 30 delivers the road number acquired at step ST14 or the road number extracted at step ST23 to at least one of the display processing unit 44 and voice message creating unit 45.

When the road numbers are delivered from the control unit 30, the display processing unit 44 forms the display data for displaying them, and delivers to the display control unit 24 within the controller 20. The display control unit 24 converts the display data delivered from the display processing unit 44 to the video signal, and delivers to the display 18 via the input/output control unit 25. Thus, the road number is displayed on the screen of the display 18.

As described above, according to the navigation system of the embodiment 2 in accordance with the present invention, it is configured in such a manner that it tries to acquire both the road name and road number because as for the HOV dedicated lane (HOV dedicated road), there are many cases where it stores only the road name without storing the road number and there are some cases where the road name contains the road number, and that if one of the road name and road number contains a part capable of being informed as the road number, it extracts the road number and displays and outputs in voice. Accordingly, it can give information about the road number even as to the road that contains only the road name. As a result, it can cause a user to recognize the driving road or the road ahead (next driving road) more easily than when it gives information about the road name that is generally longer than the road number.

Embodiment 3

The navigation system of the present embodiment 3 is one that has both the functions of the navigation system of the foregoing embodiment 1 and the functions of the navigation system of the embodiment 2. The configuration of the navigation system of the embodiment 3 in accordance with the present invention is the same as that of the navigation system of the foregoing embodiment 2. The following description will be made centering on differences (in operation) from the navigation system of the embodiment 2.

Figure 7:
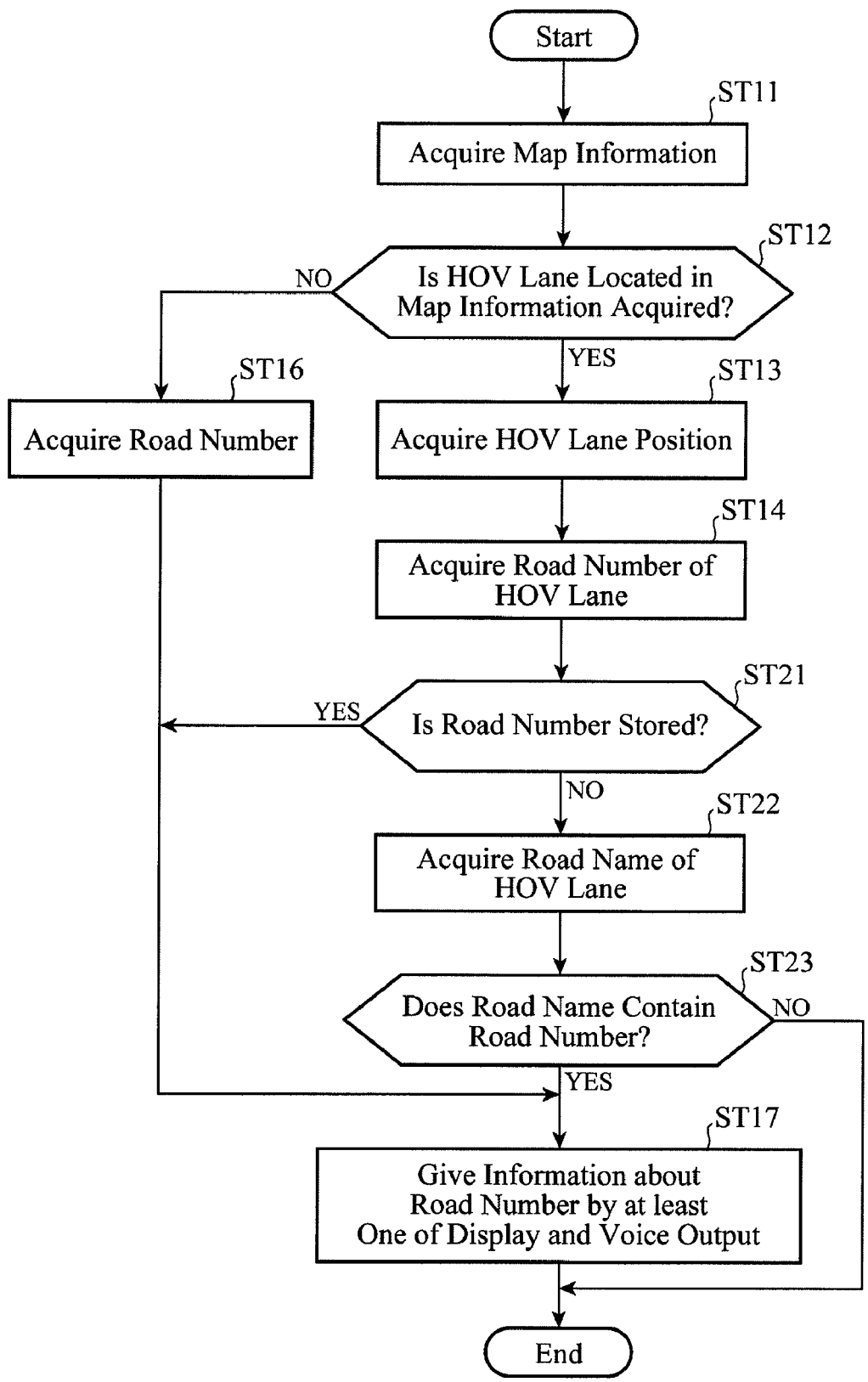
FIG. 7 is a flowchart showing the operation of a navigation system of an embodiment 2 in accordance with the present invention.
Figure 9:
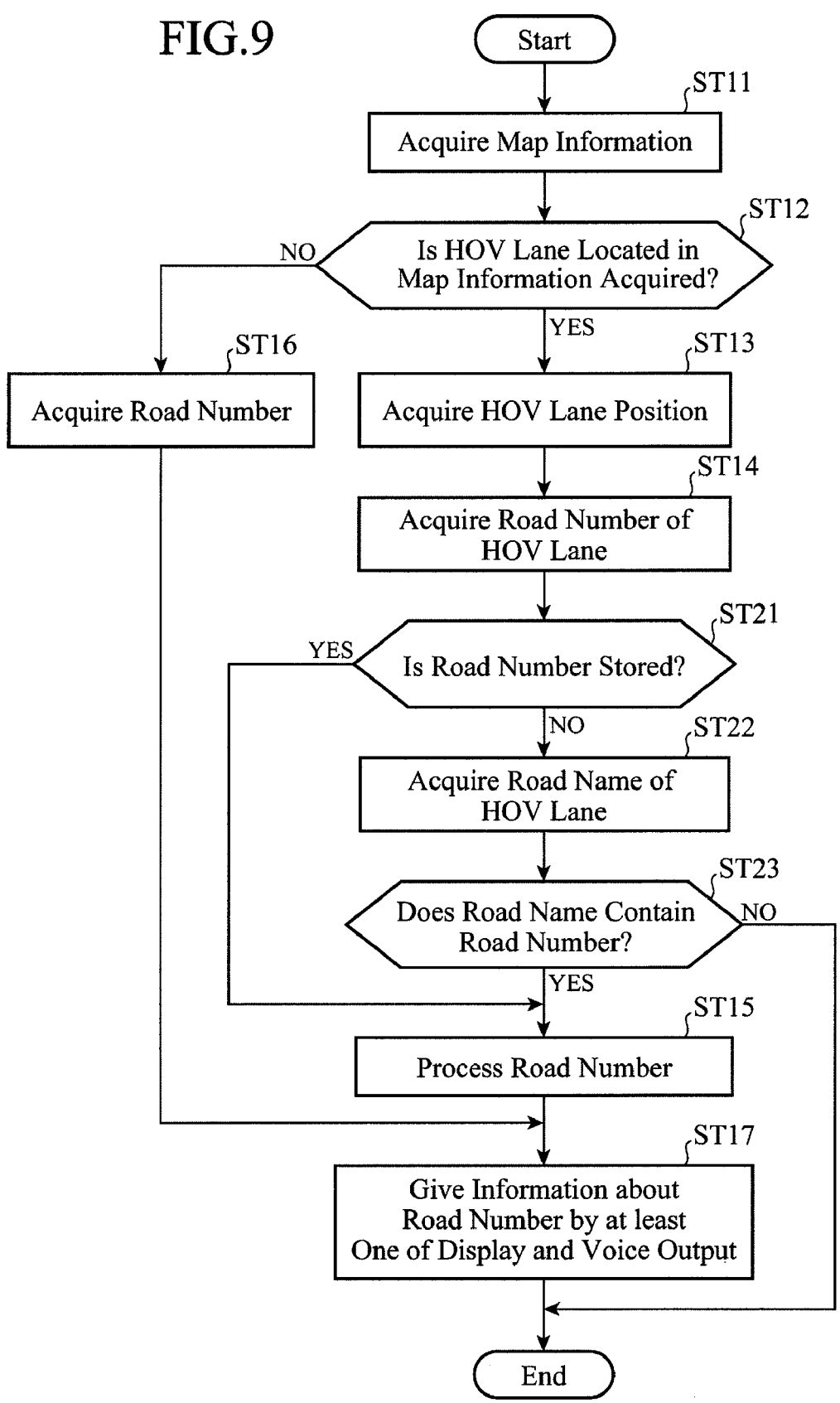
FIG. 9 is a flowchart showing the operation of a navigation system of an embodiment 3 in accordance with the present invention.

FIG. 9 is a flowchart showing the operation of the navigation system of the embodiment 3 centering on the road number information processing. Incidentally, in the flowchart shown in FIG. 9, steps executing the same or like processing to the processing in the flowchart shown in FIG. 3 and FIG. 7 are designated by the same symbols as those of FIG. 3 and FIG. 7 to simplify the explanation.

In the road number information processing, the map information is acquired, first (step ST11). Subsequently, it is checked whether the map information acquired contains an HOV lane or not (step ST12). At this step ST12, if a decision is made that no HOV lane is located, then the road number is acquired (step ST16). After that, the sequence proceeds to step ST17.

In the foregoing step ST12, if a decision is made that the HOV lane is contained, then the HOV lane position is acquired (step ST13). Subsequently, the road number of the HOV lane is acquired (step ST14). Subsequently, it is checked whether the road number is stored or not (step ST21). At this step ST21, if a decision is made that the road number is contained, the sequence proceeds to step ST15.

On the other hand, if a decision is made at step ST21 that the road number is not contained, then the road name of the HOV lane is acquired (step ST22). Subsequently, it is checked whether the road name contains the road number or not (step ST23). At this step ST23, if a decision is made that the road name does not contain the road number, the road number cannot be obtained. Accordingly, the road number information processing is terminated without giving information on the road number. On the other hand, if a decision is made at step ST23 that the road name contains the road number, then the sequence proceeds to step ST15.

At step ST15, the road number is processed. More specifically, the road number processing unit 43 processes the road number delivered from the control unit 30 as a result of the processing at step ST21 or step ST23 in such a manner as to enable a user to recognize as the HOV lane, and delivers to the control unit 30 as the HOV lane information added road number. After that, the sequence proceeds to step ST17.

At step ST17, the information is given by means of at least one of the road number display and voice output. More specifically, the control unit 30 delivers the HOV lane information added road number delivered from the road number processing unit 43 at step ST15 or the road number acquired at step ST16 to at least one of the display processing unit 44 and voice message creating unit 45.

Thus, the HOV lane information added road number or road number is displayed on the screen of the display 18. In addition, the voice output device 19 outputs the voice information corresponding to the HOV lane information added road number or road number. After that, the road number information processing is terminated.

As described above, according to the navigation system of the embodiment 3 in accordance with the present invention, it offers combined advantages of the advantages of the navigation system of the foregoing embodiment 1 and the advantages of the navigation system of the embodiment 2.

Embodiment 4

The navigation system of the embodiment 4 in accordance with the present invention is configured in such a manner as to give information about the remaining distance of an HOV lane change enabled section by display during driving in the HOV lane. The configuration of the navigation system of the embodiment 4 in accordance with the present invention is the same as that of the navigation system of the foregoing embodiment 1. The following description will be made centering on differences (in operation) from the navigation system of the embodiment 1.

Figure 10:
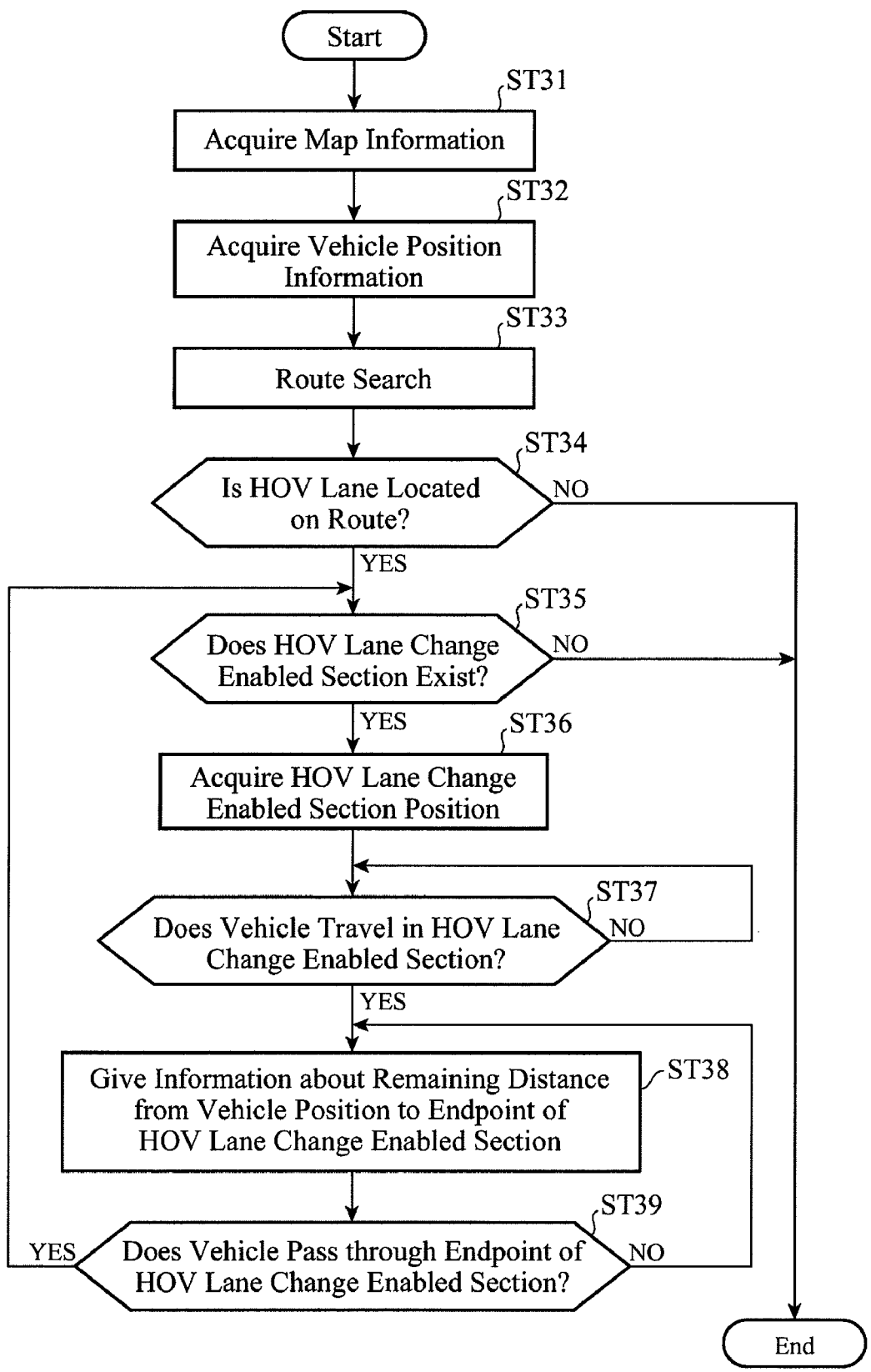
FIG. 10 is a flowchart showing the operation of a navigation system of an embodiment 4 in accordance with the present invention.

FIG. 10 is a flowchart showing the operation of the navigation system of the embodiment 4 centering on the remaining distance information processing. In the remaining distance information processing, the map information is acquired, first (step ST31). More specifically, the control unit 30 acquires the map information from the map information storage 17 via the map information acquiring unit 31, and delivers to the route search unit 36. Subsequently, the vehicle position information is acquired (step ST32). More specifically, the control unit 30 acquires the vehicle position information from the current position detecting unit 32, and delivers to the route search unit 36.

Subsequently, a route search is carried out (step ST33). More specifically, the route search unit 36, considering the current position indicated by the vehicle position information delivered from the current position detecting unit 32 at step ST32 as a starting place, searches for a route to the destination input through the input device 11 from the map information acquired from the map information acquiring unit 31 at step ST31. The route searched by the route search unit 36 is delivered to the route storage unit 37 as the route data.

Subsequently, it is checked whether the route has an HOV lane or not (step ST34). More specifically, the HOV lane decision unit 38 acquires the route data from the route storage unit 37, and decides whether the route indicated by the route data includes an HOV lane or not. The decision result of the HOV lane decision unit 38 is delivered to the control unit 30. If a decision is made at this step ST34 that no HOV lane is located on the route, the HOV lane change enabled section does not exist. Thus, the remaining distance information processing is terminated.

On the other hand, if a decision is made at step ST34 that the HOV lane is located on the route, then it is checked whether the HOV lane change enabled section is located or not (step ST35). More specifically, when the decision result acquired from the HOV lane decision unit 38 indicates that the route includes the HOV lane, the control unit 30 acquires lane change enabled position information indicating the position where a lane change is allowed between the HOV lane and another lane from the link data corresponding to the HOV lane. If a decision is made at this step ST35 that the HOV lane change enabled section is not present, the remaining distance information processing is terminated.

On the other hand, if a decision is made at step ST35 that the HOV lane change enabled section is located, the HOV lane change enabled section position is acquired (step ST36). More specifically, the control unit 30 acquires the HOV lane change enabled section position from the lane change enabled position information acquired at step ST35.

Subsequently, it is checked whether the vehicle is driving in the HOV lane change enabled section or not (step ST37). More specifically, the control unit 30 checks whether the current position detected with the current position detecting unit 32 is located in the HOV lane change enabled section acquired at step ST36 or not. If a decision is made at this step ST37 that the vehicle is not traveling in the HOV lane change enabled section, it enters a standby mode in which this step ST37 is executed repeatedly.

If a decision is made that the vehicle is traveling in the HOV lane change enabled section in the standby mode in which this step ST37 is executed repeatedly, then the information about the remaining distance from the vehicle position to the endpoint of the HOV lane change enabled section is given by display (step ST38). More specifically, the HOV lane remaining distance calculating unit 42 calculates the remaining distance to be covered in the HOV lane change enabled section from the entrance/exit position data delivered from the HOV lane entrance/exit extracting unit 39 and the vehicle position information delivered from the current position detecting unit 32, and delivers to the display processing unit 44 as the remaining distance data.

Figure 11:
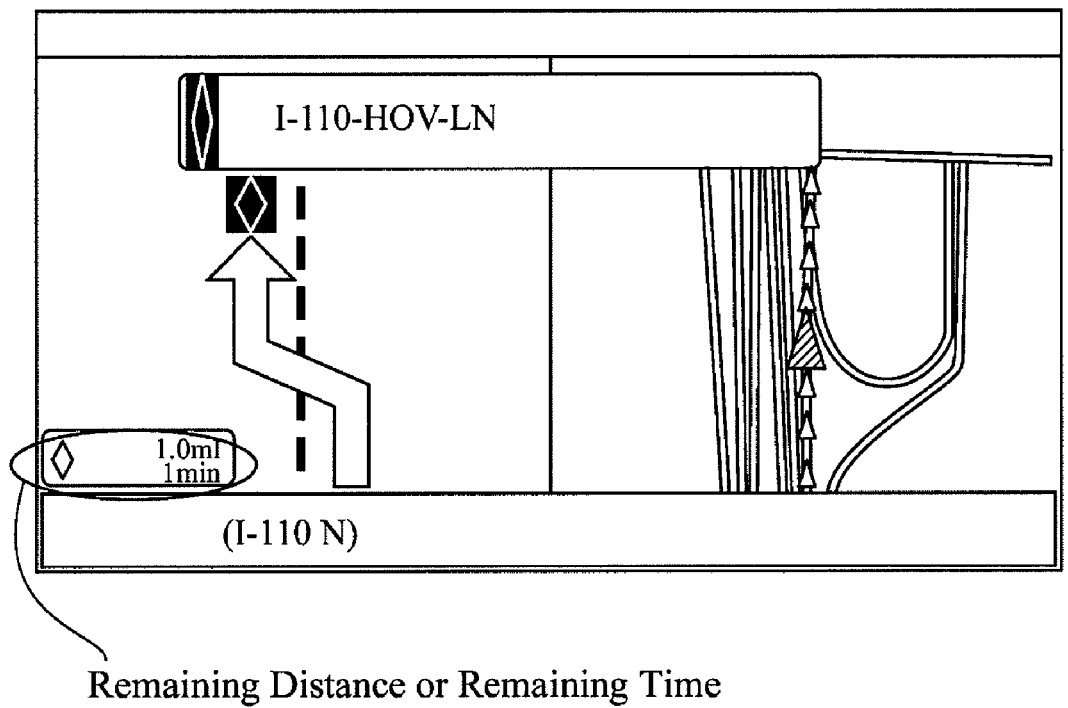
FIG. 11 is a diagram showing an example of displaying a remaining distance or remaining time on the screen of a display of the navigation system of the embodiment 4 or 6 in accordance with the present invention.

The display processing unit 44 creates the display data for causing the display 18 to display the remaining distance to be covered in the HOV lane indicated by the remaining distance data delivered from the HOV lane remaining distance calculating unit 42, and delivers to the display control unit 24 within the controller 20. The display control unit 24 converts the display data received to the video signal and delivers to the display 18 via the input/output control unit 25. Thus, the remaining distance from the vehicle position to the endpoint of the HOV lane change enabled section is displayed on the guide map displayed on the display 18 as shown in FIG. 11.

Subsequently, it is checked whether the vehicle has passed through the endpoint of the HOV lane change enabled section or not (step ST39). More specifically, the control unit 30 checks whether the current position detected by the current position detecting unit 32 is located in the HOV lane change enabled section acquired at step ST36 or not. If a decision is made at this step ST39 that the vehicle has not yet passed through the endpoint of the HOV lane change enabled section, the sequence returns to step ST38 to repeat the foregoing processing. Thus, the remaining distance displayed on the guide map displayed on the display 18 changes every moment in accordance with the driving.

On the other hand, if a decision is made at step ST39 that the vehicle has passed through the endpoint of the HOV lane change enabled section, the sequence returns to step ST35 to repeat the foregoing processing. Thus, the processing is executed for the next HOV lane change enabled section on the HOV lane.

As described above, according to the navigation system of the embodiment 4 in accordance with the present invention, it is configured in such a manner that while the vehicle is traveling in the HOV lane change enabled section, it gives information about the remaining distance to the endpoint of the HOV lane change enabled section by displaying it. Accordingly, the user can recognize in advance a place as far as which a lane change has to be done, thereby being able to change the lane at the user's timing.

Embodiment 5

The navigation system of an embodiment 5 in accordance with the present invention is configured in such a manner as to inform the user of the remaining distance of the HOV lane change enabled section in voice during traveling in the HOV lane. The configuration of the navigation system of the embodiment 5 in accordance with the present invention is the same as that of the navigation system of the foregoing embodiment 4. The following description will be made centering on differences (in operation) from the navigation system of the embodiment 4.

Figure 12:
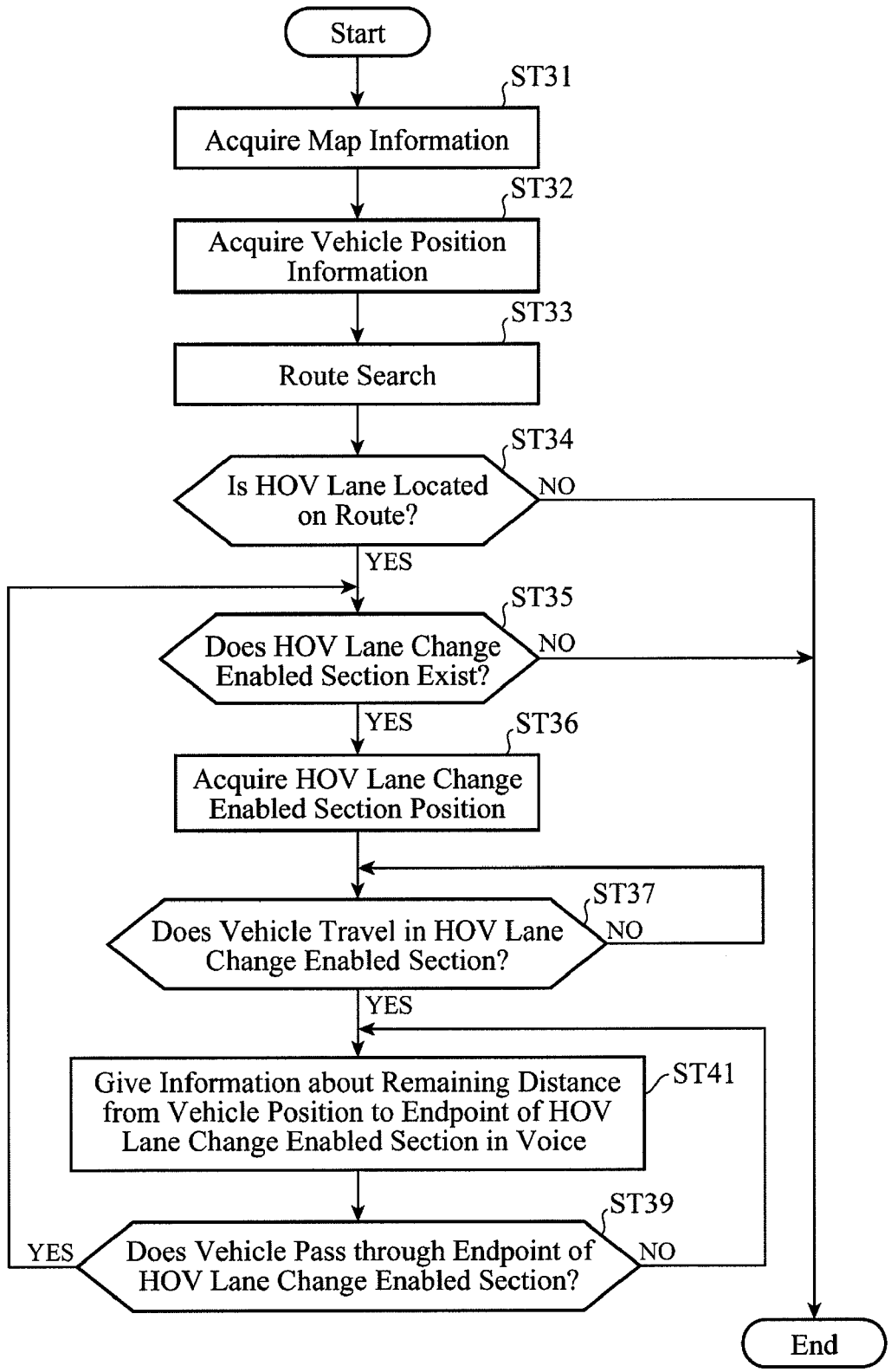
FIG. 12 is a flowchart showing the operation of a navigation system of an embodiment 5 in accordance with the present invention.

FIG. 12 is a flowchart showing the operation of the navigation system of the embodiment 5 centering on the remaining distance information processing. Incidentally, steps executing the same or like processing to the processing in the flowchart shown in FIG. 10 are designated by the same symbols as those of FIG. 10 to simplify the explanation.

In the remaining distance information processing, the map information is acquired, first (step ST31). Subsequently, the vehicle position information is acquired (step ST32). Subsequently, the route search is conducted (step ST33). Subsequently, it is checked whether the route has an HOV lane or not (step ST34). If a decision is made at this step ST34 that no HOV lane is located on the route, the remaining distance information processing is terminated because no HOV lane change enabled section is located.

On the other hand, if a decision is made at step ST34 that the HOV lane is located on the route, then it is checked whether the HOV lane change enabled section is located or not (step ST35). If a decision is made at this step ST35 that no HOV lane change enabled section is located, the remaining distance information processing is terminated.

On the other hand, if a decision is made at step ST35 that the HOV lane change enabled section is located, the HOV lane change enabled section position is acquired (step ST36). Subsequently, it is checked whether the vehicle is traveling in the HOV lane change enabled section or not (step ST37). If a decision is made at this step ST37 that the vehicle is not traveling in the HOV lane change enabled section, it enters a standby mode in which this step ST37 is executed repeatedly.

If a decision is made that the vehicle is traveling in the HOV lane change enabled section in the standby mode in which this step ST37 is executed repeatedly, then the information about the remaining distance from the vehicle position to the endpoint of the HOV lane change enabled section is output in voice (step ST41). More specifically, the HOV lane remaining distance calculating unit 42 calculates the remaining distance to be covered in the HOV lane change enabled section of the route from the entrance/exit position data delivered from the HOV lane entrance/exit extracting unit 39 and the vehicle position information delivered from the current position detecting unit 32, and delivers to the voice message creating unit 45 as the remaining distance data.

The voice message creating unit 45 forms a voice message for guidance of the remaining distance to be covered in the HOV lane indicated by the remaining distance data delivered from the HOV lane remaining distance calculating unit 42, and delivers to the voice information unit 46 as the voice data. The voice information unit 46 converts the voice data delivered from the voice message creating unit 45 to the voice signal, and delivers it to the voice output device 19. The voice output device 19 outputs the voice information indicating the remaining distance to the endpoint of the HOV lane change enabled section.

Subsequently, it is checked whether the vehicle has passed through the endpoint of the HOV lane change enabled section or not (step ST39). If a decision is made at this step ST39 that the vehicle has not yet passed through the endpoint of the HOV lane change enabled section, the sequence returns to step ST41 to repeat the foregoing processing. Thus, the remaining distance output from the voice output device 19 changes every moment in accordance with the driving.

On the other hand, if a decision is made at step ST39 that the vehicle has passed through the endpoint of the HOV lane change enabled section, the sequence returns to step ST35 to repeat the foregoing processing. Thus, the processing is executed for the next HOV lane change enabled section on the HOV lane.

As described above, according to the navigation system of the embodiment 5 in accordance with the present invention, it is configured in such a manner that while the vehicle is traveling in the HOV lane change enabled section, it gives information about the remaining distance to the endpoint of the HOV lane change enabled section in voice. Accordingly, the user can recognize in advance a place as far as which a lane change has to be done, thereby being able to change the lane at the user's timing.

Embodiment 6

The navigation system of the embodiment 6 in accordance with the present invention is configured in such a manner as to give information about the remaining time of an HOV lane change enabled section by display during driving in the HOV lane. The configuration of the navigation system of the embodiment 6 in accordance with the present invention is the same as that of the navigation system of the foregoing embodiment 4. The following description will be made centering on differences (in operation) from the navigation system of the embodiment 4.

Figure 13:
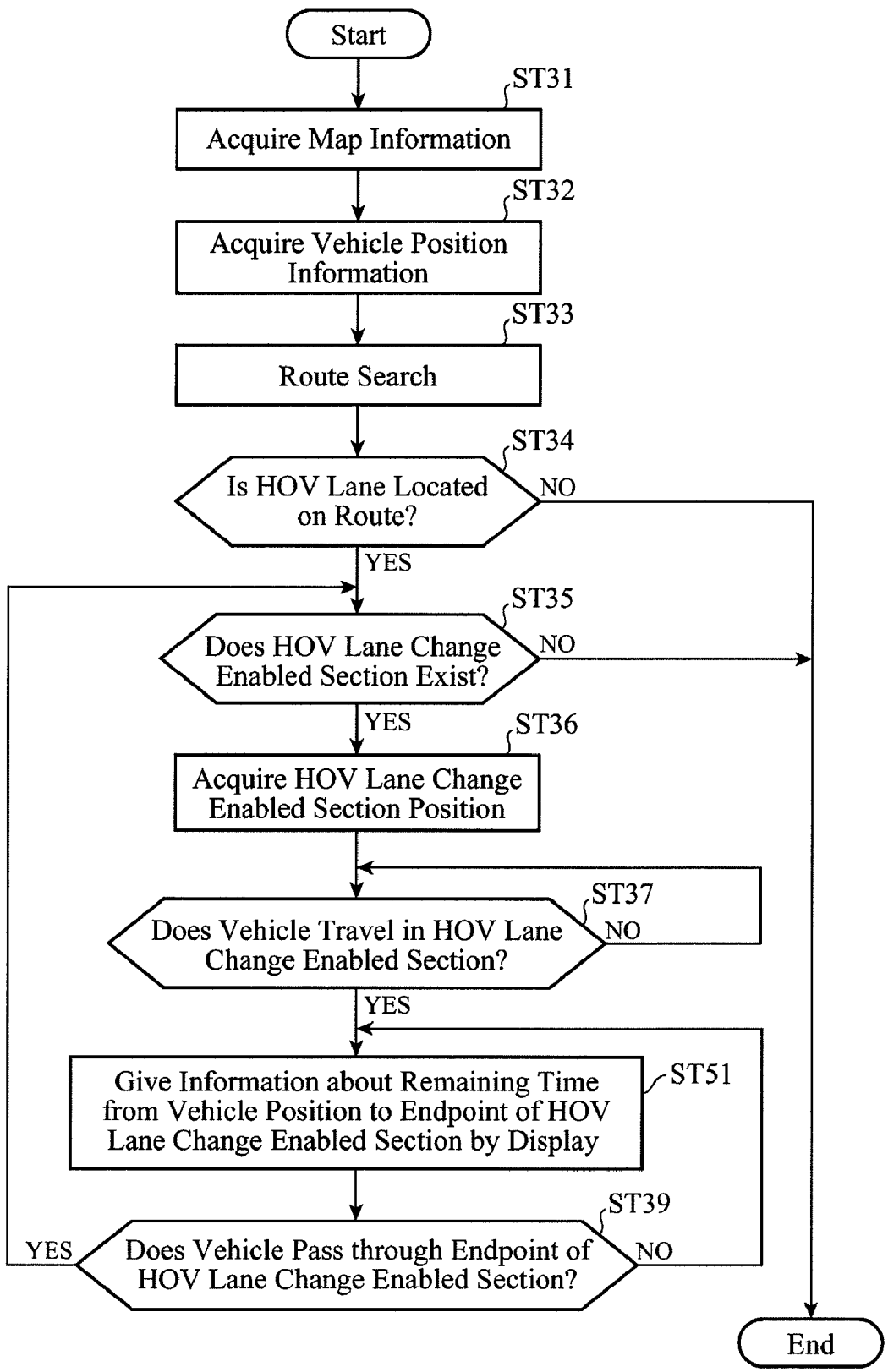
FIG. 13 is a flowchart showing the operation of a navigation system of an embodiment 6 in accordance with the present invention.

FIG. 13 is a flowchart showing the operation of the navigation system of the embodiment 6 centering on the remaining time information processing. Incidentally, steps executing the same or like processing to the processing in the flowchart shown in FIG. 10 are designated by the same symbols as those of FIG. 10 to simplify the explanation.

In the remaining time information processing, the map information is acquired, first (step ST31). Subsequently, the vehicle position information is acquired (step ST32). Subsequently, the route search is conducted (step ST33). Subsequently, it is checked whether the route has an HOV lane or not (step ST34). If a decision is made at this step ST34 that no HOV lane is located on the route, the remaining time information processing is terminated because no HOV lane change enabled section is located.

On the other hand, if a decision is made at step ST34 that the HOV lane is located on the route, then it is checked whether the HOV lane change enabled section is located or not (step ST35). If a decision is made at this step ST35 that no HOV lane change enabled section is located, the remaining time information processing is terminated.

On the other hand, if a decision is made at step ST35 that the HOV lane change enabled section is located, the HOV lane change enabled section position is acquired (step ST36). Subsequently, it is checked whether the vehicle is traveling in the HOV lane change enabled section or not (step ST37). If a decision is made at this step ST37 that the vehicle is not traveling in the HOV lane change enabled section, it enters a standby mode in which this step ST37 is executed repeatedly.

If a decision is made that the vehicle is traveling in the HOV lane change enabled section in the standby mode in which this step ST37 is executed repeatedly, then the information about the remaining time from the vehicle position to the endpoint of the HOV lane change enabled section is given by display (step ST51). More specifically, the HOV lane remaining time calculating unit 41 calculates the remaining time of traveling in the HOV lane change enabled section from the entrance/exit position data delivered from the HOV lane entrance/exit extracting unit 39 and the vehicle position information delivered from the current position detecting unit 32, and delivers to the display processing unit 44 as the remaining time data. The display processing unit 44 creates the display data for causing the display 18 to display the remaining time of traveling the HOV lane indicated by the remaining time data delivered from the HOV lane remaining time calculating unit 41, and delivers to the display control unit 24 within the controller 20. The display control unit 24 converts the display data received to the video signal and delivers to the display 18 via the input/output control unit 25. Thus, as shown in FIG. 11, the remaining time from the vehicle position to the endpoint of the HOV lane change enabled section is displayed on the guide map displayed on the display 18.

Subsequently, it is checked whether the vehicle has passed through the endpoint of the HOV lane change enabled section or not (step ST39). If a decision is made at this step ST39 that the vehicle has not yet passed through the endpoint of the HOV lane change enabled section, the sequence returns to step ST51 to repeat the foregoing processing. Thus, the remaining time on the guide map displayed on the display 18 changes every moment in accordance with the driving.

On the other hand, if a decision is made at step ST39 that the vehicle has passed through the endpoint of the HOV lane change enabled section, the sequence returns to step ST35 to repeat the foregoing processing. Thus, the processing is executed for the next HOV lane change enabled section on the HOV lane.

As described above, according to the navigation system of the embodiment 6 in accordance with the present invention, it is configured in such a manner that while the vehicle is traveling in the HOV lane change enabled section, it gives information about the remaining time to the endpoint of the HOV lane change enabled section by displaying it. Accordingly, the user can recognize in advance a place as far as which a lane change has to be done, thereby being able to change the lane at the user's timing.

Embodiment 7

The navigation system of an embodiment 7 in accordance with the present invention is configured in such a manner as to give information about the remaining time of the HOV lane change enabled section in voice during traveling in the HOV lane. The configuration of the navigation system of the embodiment 7 in accordance with the present invention is the same as that of the navigation system of the foregoing embodiment 4. The following description will be made centering on differences (in operation) from the navigation system of the embodiment 4.

Figure 14:
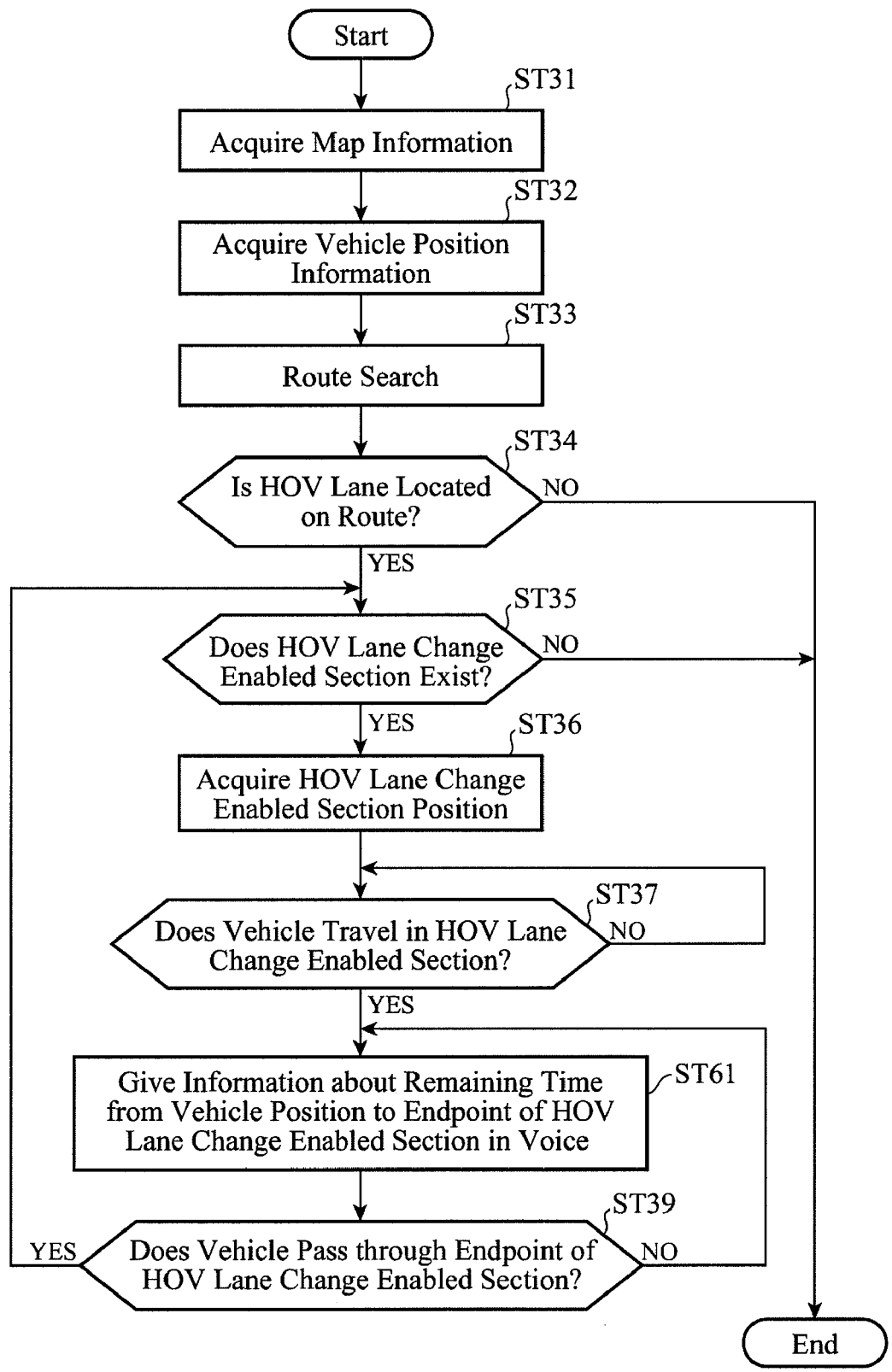
FIG. 14 is a flowchart showing the operation of a navigation system of an embodiment 7 in accordance with the present invention.

FIG. 14 is a flowchart showing the operation of the navigation system of the embodiment 7 centering on the remaining time information processing. Incidentally, steps executing the same or like processing to the processing in the flowchart shown in FIG. 10 are designated by the same symbols as those of FIG. 10 to simplify the explanation.

In the remaining time information processing, the map information is acquired, first (step ST31). Subsequently, the vehicle position information is acquired (step ST32). Subsequently, the route search is conducted (step ST33). Subsequently, it is checked whether the route has an HOV lane or not (step ST34). If a decision is made at this step ST34 that no HOV lane is located on the route, the remaining time information processing is terminated because no HOV lane change enabled section is located.

On the other hand, if a decision is made at step ST34 that the HOV lane is located on the route, then it is checked whether the HOV lane change enabled section is located or not (step ST35). If a decision is made at this step ST35 that no HOV lane change enabled section is located, the remaining time information processing is terminated.

On the other hand, if a decision is made at step ST35 that the HOV lane change enabled section is located, the HOV lane change enabled section position is acquired (step ST36). Subsequently, it is checked whether the vehicle is traveling in the HOV lane change enabled section or not (step ST37). If a decision is made at this step ST37 that the vehicle is not traveling in the HOV lane change enabled section, it enters a standby mode in which this step ST37 is executed repeatedly.

If a decision is made that the vehicle is traveling in the HOV lane change enabled section in the standby mode in which this step ST37 is executed repeatedly, then the information about the remaining time from the vehicle position to the endpoint of the HOV lane change enabled section is output in voice (step ST61). More specifically, the HOV lane remaining time calculating unit 41 calculates the remaining time of traveling in the HOV lane change enabled section of the route from the entrance/exit position data delivered from the HOV lane entrance/exit extracting unit 39 and the vehicle position information delivered from the current position detecting unit 32, and delivers to the voice message creating unit 45 as the remaining time data.

The voice message creating unit 45 forms a voice message for guidance of the remaining time of traveling in the HOV lane indicated by the remaining time data delivered from the HOV lane remaining time calculating unit 41, and delivers to the voice information unit 46 as the voice data. The voice information unit 46 converts the voice data delivered from the voice message creating unit 45 to the voice signal, and delivers it to the voice output device 19. Thus, the voice output device 19 outputs the voice information indicating the remaining time for passing through the endpoint of the HOV lane change enabled section.

Subsequently, it is checked whether the vehicle has passed through the endpoint of the HOV lane change enabled section or not (step ST39). If a decision is made at this step ST39 that the vehicle has not yet passed through the endpoint of the HOV lane change enabled section, the sequence returns to step ST61 to repeat the foregoing processing. Thus, the remaining time output from the voice output device 19 changes every moment in accordance with the driving.

On the other hand, if a decision is made at step ST39 that the vehicle has passed through the endpoint of the HOV lane change enabled section, the sequence returns to step ST35 to repeat the foregoing processing. Thus, the processing is executed for the next HOV lane change enabled section on the HOV lane.

As described above, according to the navigation system of the embodiment 7 in accordance with the present invention, it is configured in such a manner that while the vehicle is traveling in the HOV lane change enabled section, it gives information about the remaining time to the endpoint of the HOV lane change enabled section in voice. Accordingly, the user can recognize in advance a place as far as which a lane change has to be done, thereby being able to change the lane at the user's timing.

Incidentally, although the navigation systems of the foregoing embodiment 4 to embodiment 7 are configured in such a manner as to give information about the remaining distance or remaining time during driving in the HOV lane on the route obtained by the route search, a configuration is also possible which gives information about the remaining distance or remaining time when a route is not present, or when driving in an ordinary lane though the route is located.

Embodiment 8

The navigation system of an embodiment 8 in accordance with the present invention is configured in such a manner as to display an entrance/exit between an HOV lane and another lane as a guide section mark. The configuration of the navigation system of the embodiment 8 in accordance with the present invention is the same as that of the navigation system of the foregoing embodiment 4. The following description will be made centering on differences (in operation) from the navigation system of the embodiment 4.

Figure 15:
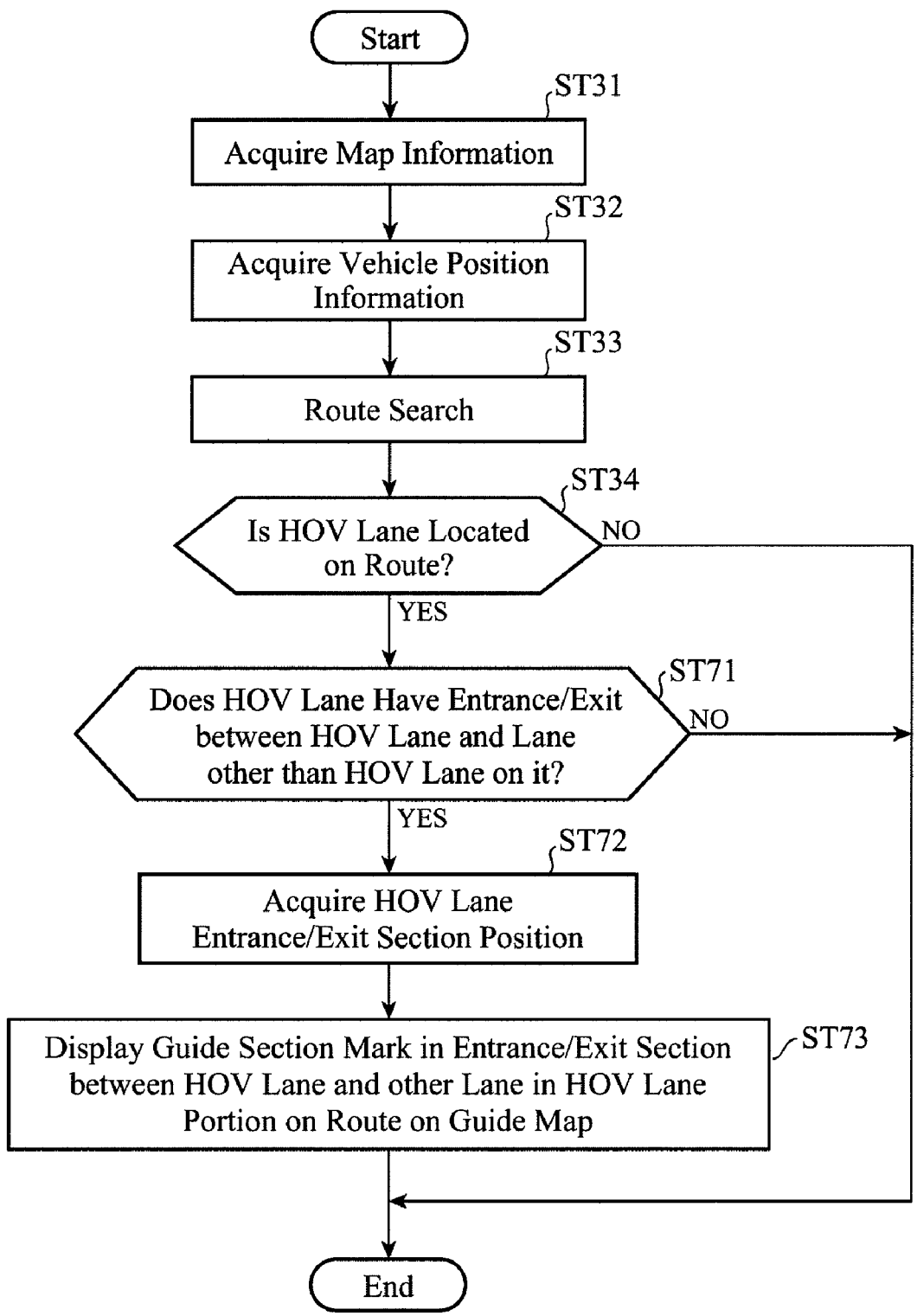
FIG. 15 is a flowchart showing the operation of a navigation system of an embodiment 8 in accordance with the present invention.

FIG. 15 is a flowchart showing the operation of the navigation system of the embodiment 8 centering on the entrance/exit information processing. Incidentally, steps executing the same or like processing to the processing in the flowchart shown in FIG. 10 are designated by the same symbols as those of FIG. 10 to simplify the explanation.

In the entrance/exit information processing, the map information is acquired, first (step ST31). Subsequently, the vehicle position information is acquired (step ST32). Subsequently, the route search is conducted (step ST33). Subsequently, it is checked whether the route has an HOV lane or not (step ST34). If a decision is made at this step ST34 that no HOV lane is located on the route, the entrance/exit information processing is terminated because no HOV lane entrance/exit is placed.

On the other hand, if a decision is made at step ST34 that the HOV lane is located on the route, then it is checked whether an entrance/exit between the HOV lane and another lane is placed on the HOV lane or not (step ST71). More specifically, the HOV lane entrance/exit extracting unit 39 extracts, when the decision result acquired from the HOV lane decision unit 38 indicates that the route includes the HOV lane, an entrance/exit section between the lanes other than the HOV lane and the HOV lane, and delivers to the control unit 30. If a decision is made at this step ST71 that the entrance/exit between the HOV lane and another lane is not placed on the HOV lane, the entrance/exit information processing is terminated.

On the other hand, if a decision is made at step ST71 that the entrance/exit is placed between the HOV lane and another lane on the HOV lane, an HOV lane entrance/exit section position is acquired (step ST72). More specifically, the control unit 30 acquires, when the entrance/exit position data is delivered from the HOV lane entrance/exit extracting unit 39, the section indicated by the entrance/exit position data as the HOV lane entrance/exit section position.

Figure 16:
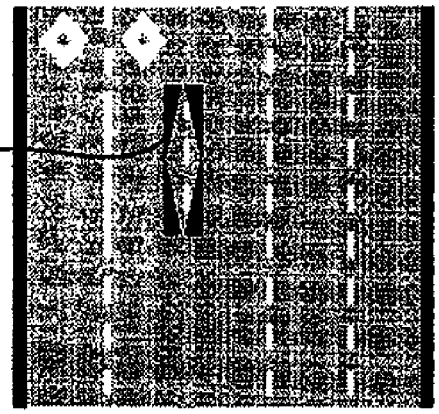
FIG. 16 is a diagram showing an example of displaying a guide section mark in the navigation system of the embodiment 8 in accordance with the present invention.

Subsequently, a guide section mark is displayed in the entrance/exit section between the HOV lane and another lane in a part of the HOV lane on the route on the guide map (step ST73). More specifically, the control unit 30 delivers the HOV lane entrance/exit section position acquired at step ST72 to the display processing unit 44. The display processing unit 44 creates display data for causing the display 18 to display the HOV lane entrance/exit section position delivered from the control unit 30 as the guide section mark, and delivers to the display control unit 24 within the controller 20. The display control unit 24 converts the display data received to the video signal, and delivers to the display 18 via the input/output control unit 25. Thus, the guide section mark as shown in FIG. 16 is displayed in the entrance/exit section between the HOV lane and another lane on the guide map displayed on the display 18.

As described above, according to the navigation system of the embodiment 8 in accordance with the present invention, since it is configured in such a manner as to display the guide section mark in the entrance/exit section to make the entrance/exit section of the HOV lane distinct on the guide map, the user can recognize that he or she is approaching a place of entry and departure and that which place on the route he or she should enter or exit.

Embodiment 9

The navigation system of an embodiment 9 in accordance with the present invention is configured in such a manner as to display the guide section mark indicating an entrance/exit between the HOV lane and another lane in different shapes in accordance with the time regulation. The configuration of the navigation system of the embodiment 9 in accordance with the present invention is the same as that of the navigation system of the foregoing embodiment 8. The following description will be made centering on differences (in operation) from the navigation system of the embodiment 8.

Figure 17:
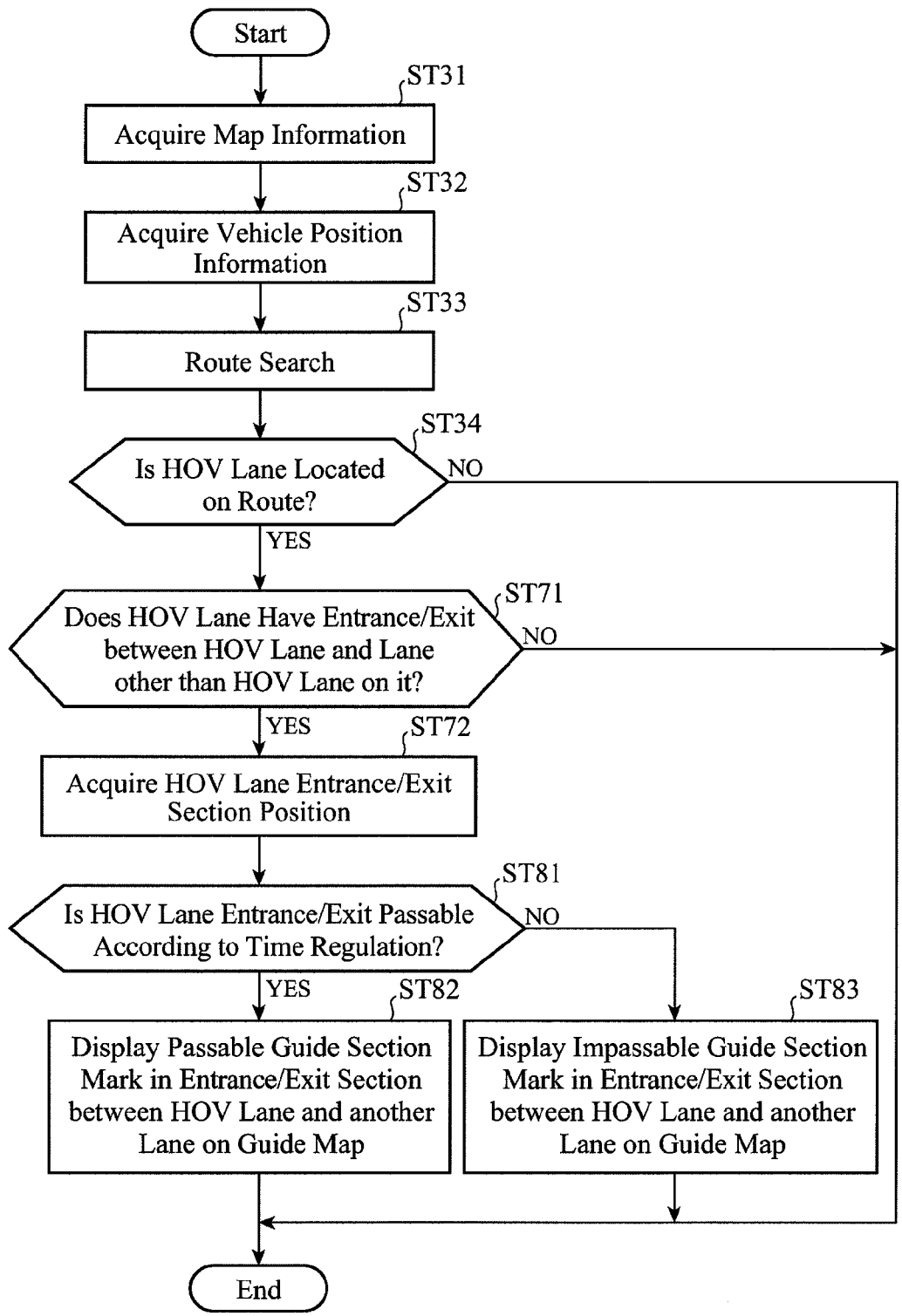
FIG. 17 is a flowchart showing the operation of a navigation system of an embodiment 9 in accordance with the present invention.

FIG. 17 is a flowchart showing the operation of the navigation system of the embodiment 9 centering on the entrance/exit information processing. Incidentally, steps executing the same or like processing to the processing in the flowchart shown in FIG. 15 are designated by the same symbols as those of FIG. 15 to simplify the explanation.

In the entrance/exit information processing, the map information is acquired, first (step ST31). Subsequently, the vehicle position information is acquired (step ST32). Subsequently, the route search is conducted (step ST33). Subsequently, it is checked whether the route has an HOV lane or not (step ST34). If a decision is made at this step ST34 that no HOV lane is located on the route, the entrance/exit information processing is terminated because no HOV lane entrance/exit is placed.

On the other hand, if a decision is made at step ST34 that the HOV lane is located on the route, then it is checked whether an entrance/exit between the HOV lane and another lane is placed on the HOV lane (step ST71). More specifically, the HOV lane entrance/exit extracting unit 39 extracts, when the decision result acquired from the HOV lane decision unit 38 indicates that the route includes the HOV lane, an entrance/exit section between the lanes other than the HOV lane and the HOV lane, and delivers to the control unit 30 as an entrance/exit position data. If a decision is made at this step ST71 that the entrance/exit between the HOV lane and another lane is not placed on the HOV lane, the entrance/exit information processing is terminated.

On the other hand, if a decision is made at step ST71 that the entrance/exit is placed between the HOV lane and another lane on the HOV lane, the HOV lane entrance/exit section position is acquired (step ST72). More specifically, the control unit 30 acquires, when the entrance/exit position data is delivered from the HOV lane entrance/exit extracting unit 39, the section indicated by the entrance/exit position data as the HOV lane entrance/exit section position.

Subsequently, it is checked whether the HOV lane entrance/exit is passable or not according to the time regulation (step ST81). More specifically, the control unit 30 acquires from the link data corresponding to the HOV lane the time regulation information indicating a passable/impassable state of the HOV lane entrance/exit in accordance with time, and checks whether the HOV lane entrance/exit is passable at that time.

If a decision is made at this step ST81 that the HOV lane entrance/exit is passable according to the time regulation, a passable guide section mark is displayed in the entrance/exit section between the HOV lane and another lane on the guide map (step ST82). More specifically, the control unit 30 delivers the HOV lane entrance/exit section position acquired at step ST72 to the display processing unit 44. The display processing unit 44 forms the display data for causing the display 18 to display the HOV lane entrance/exit section position delivered from the control unit 30 as the passable guide section mark, and delivers to the display control unit 24 within the controller 20. The display control unit 24 converts the display data received to the video signal, and delivers to the display 18 via the input/output control unit 25. Thus, the guide section mark is displayed in the entrance/exit section between the HOV lane and another lane on the guide map displayed on the display 18.

On the other hand, if a decision is made at step ST81 that the HOV lane entrance/exit is impassable according to the time regulation, an impassable guide section mark is displayed in the entrance/exit section between the HOV lane and another lane on the guide map (step ST83). More specifically, the control unit 30 delivers the HOV lane entrance/exit section position acquired at step ST72 to the display processing unit 44. The display processing unit 44 forms the display data for causing the display 18 to display the HOV lane entrance/exit section position delivered from the control unit 30 as the impassable guide section mark, and delivers to the display control unit 24 within the controller 20. The display control unit 24 converts the display data received to the video signal and delivers to the display 18 via the input/output control unit 25. Thus, the impassable guide section mark is displayed in the entrance/exit section between the HOV lane and another lane on the guide map displayed on the display 18.

As for the foregoing passable guide section mark and the impassable guide section mark, they can be formed in such a manner as to have different designs, colors, shapes or brightness.

As described above, according to the navigation system of the embodiment 9 in accordance with the present invention, since it is configured in such a manner as to display the guide section mark of the entrance/exit displayed on the guide map in different designs, colors, shapes or brightness in accordance with the passable/impassable state of the HOV lane entrance/exit according to the time regulation, the user can decide the passableness of the entrance/exit section visually.

Embodiment 10

The navigation system of an embodiment 10 in accordance with the present invention is configured in such a manner as to give information about the HOV lane that is decided to be impassable according to regulation as a no entry road. The configuration of the navigation system of the embodiment 10 in accordance with the present invention is the same as that of the navigation system of the foregoing embodiment 1. The following description will be made centering on differences (in operation) from the navigation system of the embodiment 1.

Figure 18:
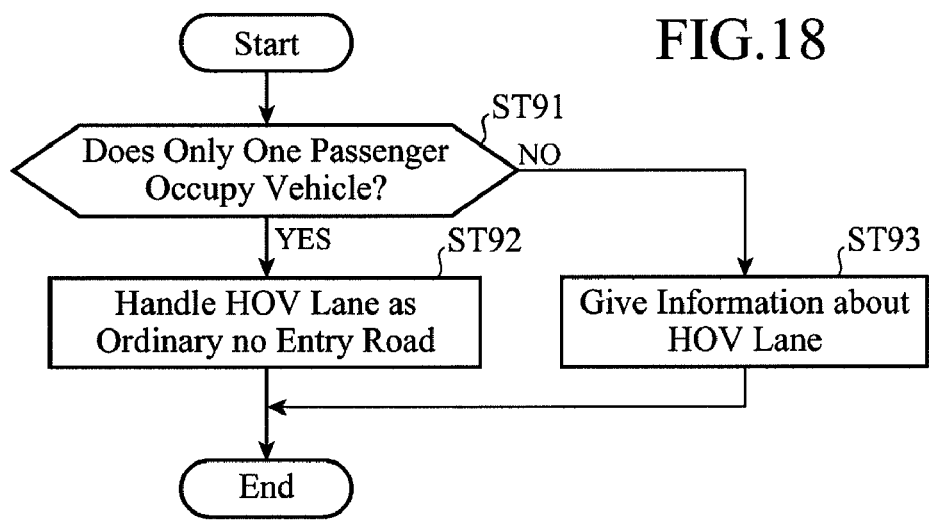
FIG. 18 is a flowchart showing the operation of a navigation system of an embodiment 10 in accordance with the present invention.

FIG. 18 is a flowchart showing the operation of the navigation system of the embodiment 10. Here, an example will be described which is regulated according to the number of passengers.

First, it is checked whether only one passenger is traveling in the vehicle or not (step ST91). More specifically, the passable/impassable decision unit 40 checks whether the number of passengers indicated by the occupant number data delivered from the occupant number detecting unit 34 is one or not. If a decision is made at this step ST91 that only one passenger is traveling in the vehicle, then the HOV lane is handled as an ordinary no entry road (step ST92). More specifically, the control unit 30 controls in such a manner as to inform about the HOV lane as a no entry road. After that, the processing is terminated.

On the other hand, if a decision is made at step ST91 that a plurality of passengers are in the vehicle rather than one, then the guidance associated with the HOV lane is performed (step ST93). More specifically, the control unit 30 controls in such a manner as to give information about the HOV lane as described above in the individual embodiments. After that, the processing is terminated.

As described above, according to the navigation system of the embodiment 10 in accordance with the present invention, since the vehicle cannot travel in the HOV lane when only one passenger drives it, it can enable the user to recognize as an impassable road by the same information as about the no entry road, thereby making it unnecessary for the user to have a particular concern about passableness of the HOV lane. Accordingly, as for the HOV lane, the user can drive with the same sense as the no entry road. Here, "handling in the same way as the no entry road" has an influence on whether to count a stub (a confusing branch road before a guide point) at the guidance, for example.

Incidentally, although the navigation system of the foregoing embodiment 10 uses the occupant number as an example of the regulation, other regulation according to time or model can also be used.

Embodiment 11

The navigation system of an embodiment 11 in accordance with the present invention is configured in such a manner as to display an HOV lane that is decided to be impassable owing to regulation as a no entry road. The configuration of the navigation system of the embodiment 11 in accordance with the present invention is the same as that of the navigation system of the foregoing embodiment 4. The following description will be made centering on differences (in operation) from the navigation system of the embodiment 4.

Figure 19:
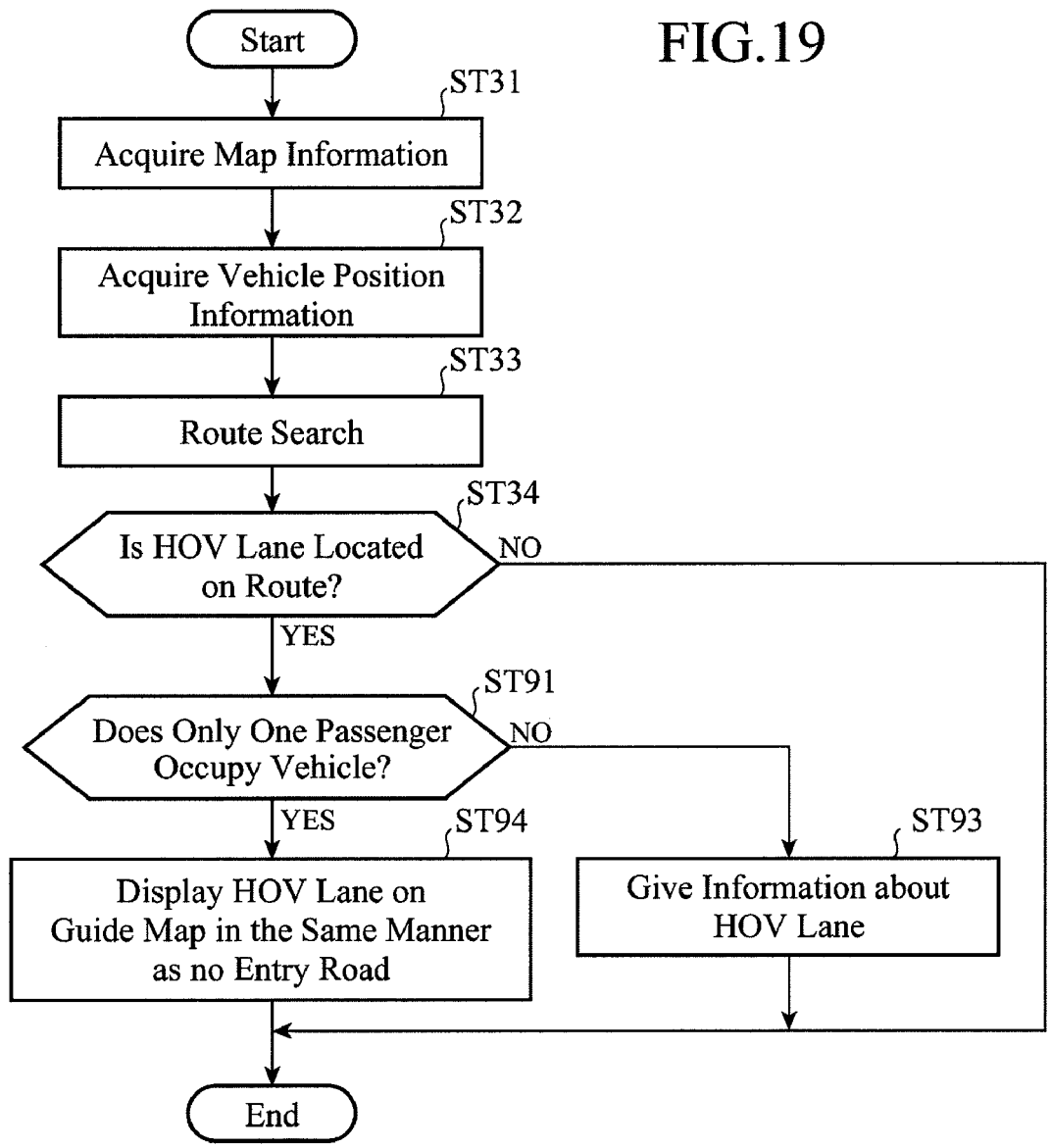
FIG. 19 is a flowchart showing the operation of a navigation system of an embodiment 11 in accordance with the present invention.

FIG. 19 is a flowchart showing the operation of the navigation system of the embodiment 11. Incidentally, steps executing the same or like processing to the processing in the flowcharts shown in FIG. 10 and FIG. 18 are designated by the same symbols as those of FIG. 10 and FIG. 18 to simplify the explanation.

In this processing, the map information is acquired, first (step ST31). Subsequently, the vehicle position information is acquired (step ST32). Subsequently, the route search is conducted (step ST33). Subsequently, it is checked whether the route has an HOV lane or not (step ST34). If a decision is made at this step ST34 that no HOV lane is located on the route, since it is not necessary to display the HOV lane as the no entry road, the processing is terminated.

Figure 20:
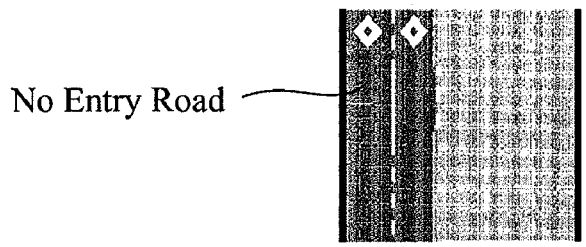
FIG. 20 is a diagram showing an example of displaying an HOV lane on a guide map in the navigation system of the embodiment 11 in accordance with the present invention.

On the other hand, if a decision is made at step ST34 that the HOV lane is located, then it is checked whether only one passenger is traveling in the vehicle or not (step ST91). If a decision is made at this step ST91 that only one passenger is traveling in the vehicle, then the HOV lane is displayed on the guide map in the same manner as the no entry road (step ST94). More specifically, the display processing unit 44 creates the display data for displaying the HOV lane as the no entry road, and delivers to the display control unit 24 within the controller 20. The display control unit 24 converts the display data received to the video signal, and delivers to the display 18 via the input/output control unit 25. Thus, as shown in FIG. 20, the HOV lane on the guide map displayed on the display 18 is displayed in the same manner as the no entry road. After that, the processing is terminated.

On the other hand, if a decision is made at step ST91 that a plurality of passengers are in the vehicle rather than one, then the guidance associated with the HOV lane is performed (step ST93). More specifically, the control unit 30 controls in such a manner as to give information about the HOV lane as described above in the individual embodiments. After that, the processing is terminated.

As described above, according to the navigation system of the embodiment 11 in accordance with the present invention, since the vehicle cannot travel in the HOV lane when only one passenger drives it, it can enable the user to visually recognize as an impassable road by displaying it on the guide map in the same manner as a no entry road, thereby making it unnecessary for the user to have a particular concern about passableness of the HOV lane. Accordingly, the user can drive the HOV lane with the same sense as the no entry road. Here, "displaying in the same way as the no entry road" means to display it while distinguishing them by design such as color when displaying the no entry road and other ordinary road.

Incidentally, although the navigation system of the foregoing embodiment 11 uses the occupant number as an example of the regulation, other regulation according to time or model can also be used.

Embodiment 12

The navigation system of an embodiment 12 in accordance with the present invention is configured in such a manner as to display a no entry mark on the HOV lane on the guide map, which is decided to be impassable according to the regulation. The configuration of the navigation system of the embodiment 12 in accordance with the present invention is the same as that of the navigation system of the foregoing embodiment 11. The following description will be made centering on differences (in operation) from the navigation system of the embodiment 11.

Figure 21:
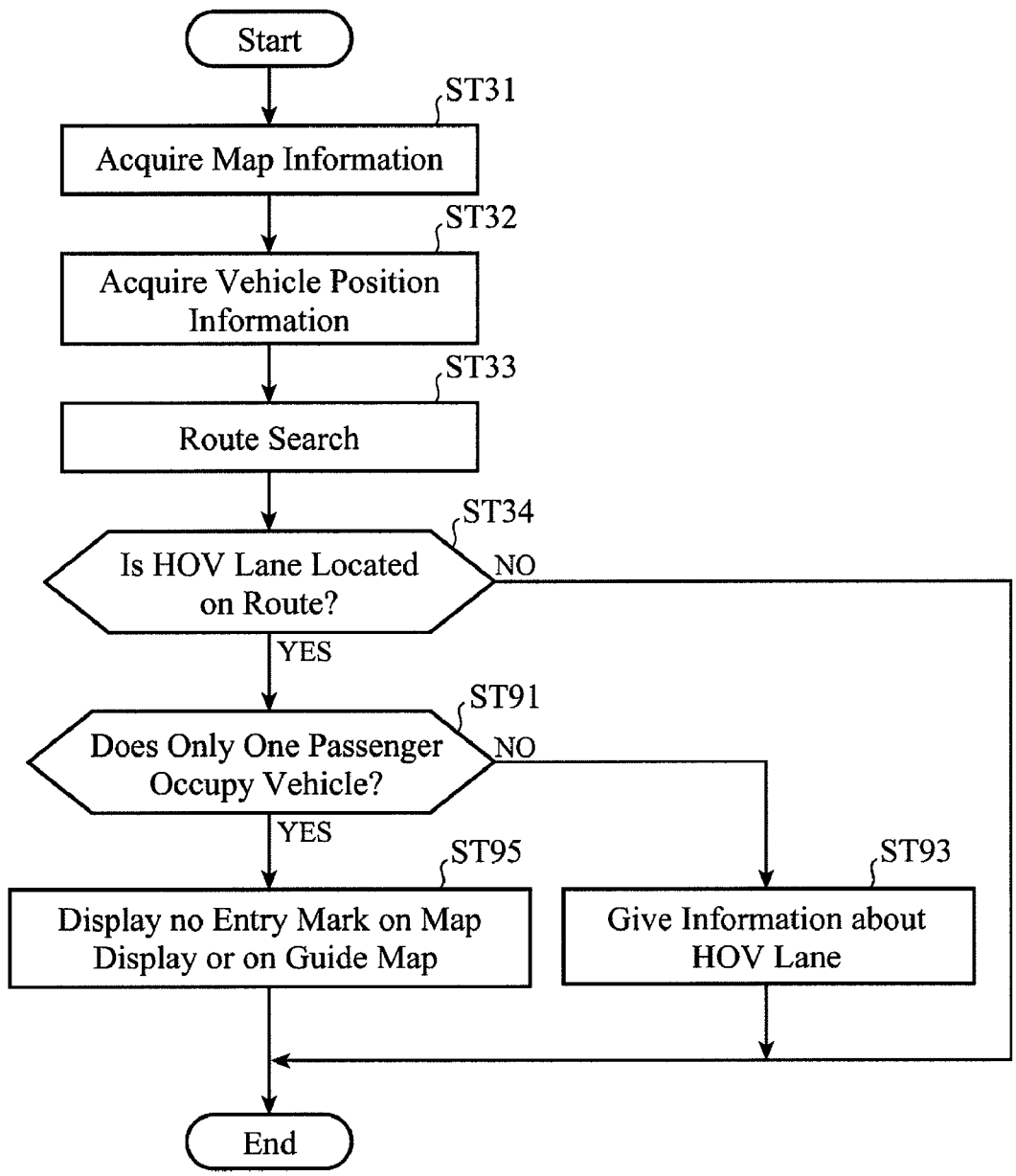
FIG. 21 is a flowchart showing the operation of a navigation system of an embodiment 12 in accordance with the present invention.

FIG. 21 is a flowchart showing the operation of the navigation system of the embodiment 12. Incidentally, steps executing the same or like processing to the processing in the flowchart shown in FIG. 19 are designated by the same symbols as those of FIG. 19 to simplify the explanation.

In this processing, the map information is acquired, first (step ST31). Subsequently, the vehicle position information is acquired (step ST32). Subsequently, the route search is conducted (step ST33). Subsequently, it is checked whether the route has an HOV lane or not (step ST34). If a decision is made at this step ST34 that no HOV lane is located on the route, the processing is terminated because it is not necessary to display the no entry mark on the HOV lane.

Figure 22:
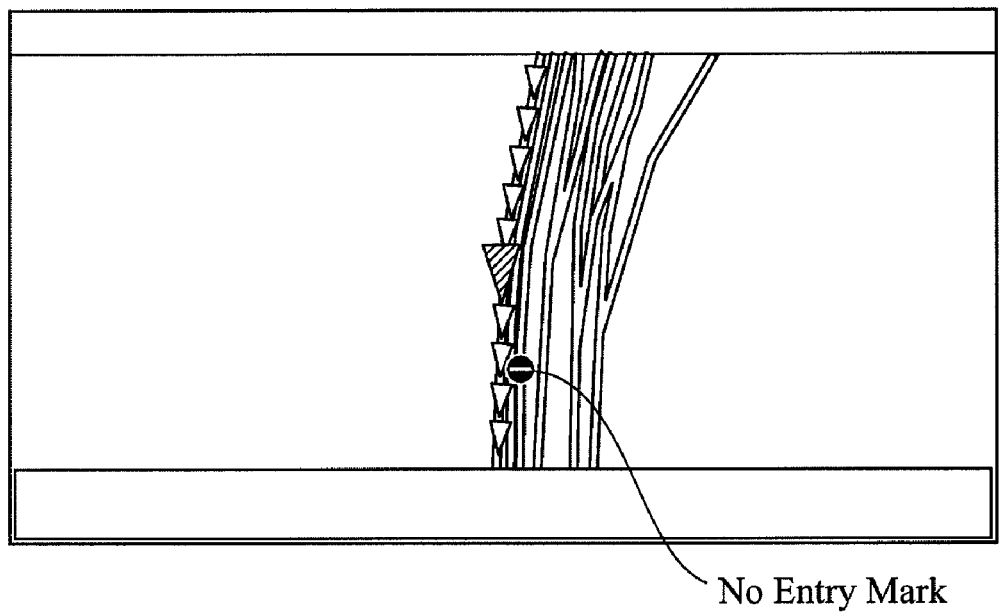
FIG. 22 is a diagram showing an example of displaying a no entry mark on a map in the navigation system of the embodiment 12 in accordance with the present invention.

On the other hand, if a decision is made at step ST34 that the HOV lane is located on the route, it is checked whether only one passenger is traveling in the vehicle or not (step ST91). If a decision is made at this step ST91 that only one passenger is traveling in the vehicle, then the no entry mark is displayed on the HOV lane on the map or on the guide map (step ST95). More specifically, the display processing unit 44 creates the display data provided with the no entry mark to be put on the HOV lane, and delivers to the display control unit 24 within the controller 20. The display control unit 24 converts the display data received to the video signal, and delivers to the display 18 via the input/output control unit 25. Thus, the no entry mark is displayed on the map displayed on the display 18 as shown in FIG. 22, for example. After that, the processing is terminated.

On the other hand, if a decision is made at step ST91 that a plurality of passengers are in the vehicle rather than one, then the guidance associated with the HOV lane is performed (step ST93). More specifically, the control unit 30 controls in such a manner as to give information about the HOV lane as described above in the individual embodiments. After that, the processing is terminated.

As described above, according to the navigation system of the embodiment 12 in accordance with the present invention, since the vehicle cannot travel in the HOV lane when only one passenger is traveling in the vehicle, it can enable the user to visually recognize as an impassable road by displaying the no entry mark as in the case of other no entry road, thereby making it unnecessary for the user to have a particular concern about passableness of the HOV lane. Accordingly, the user can drive the HOV lane with the same sense as the no entry road.

Incidentally, although the navigation system of the foregoing embodiment 12 uses the occupant number as an example of the regulation, other regulation according to time or model can also be used.

Figure 23:
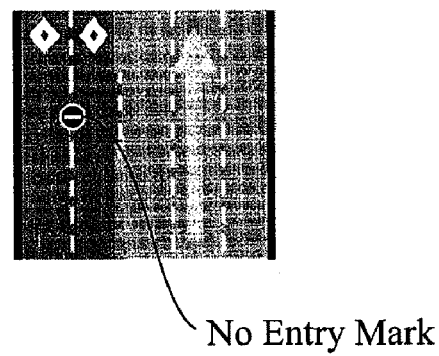
FIG. 23 is a diagram showing an example of displaying a no entry mark on a guide map in the navigation system of the embodiment 12 in accordance with the present invention.
Figure 24:
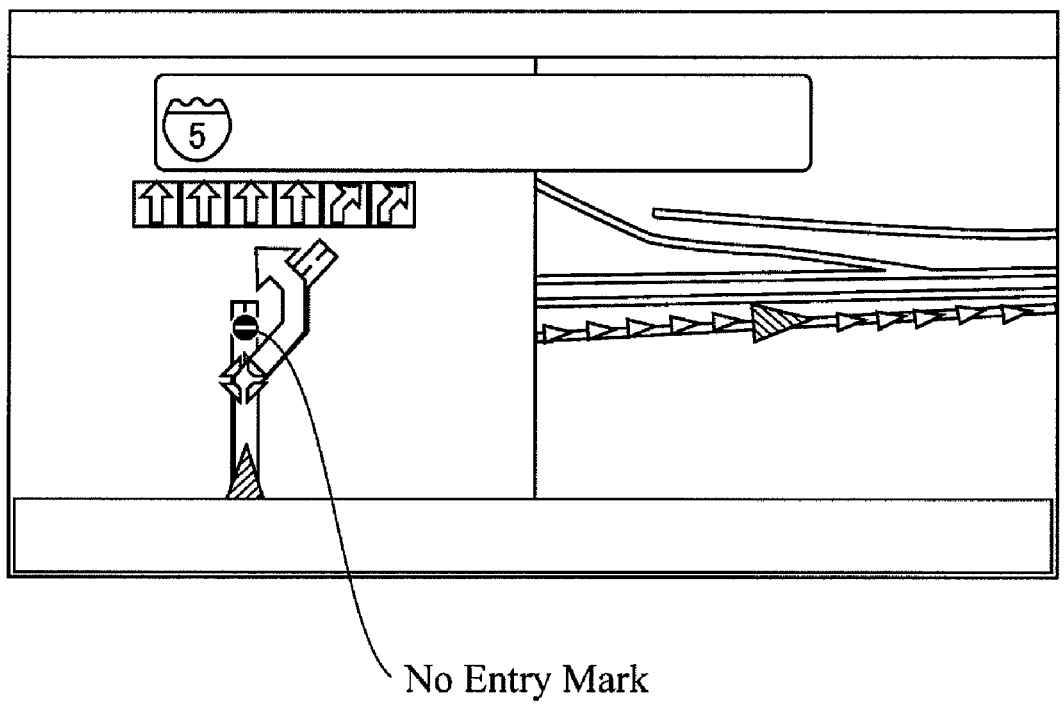
FIG. 24 is a diagram showing another example of displaying a no entry mark on the guide map in the navigation system of the embodiment 12 in accordance with the present invention.

In addition, although the navigation system of the foregoing embodiment 12 is configured in such a manner as to display the no entry mark on the map, a configuration is also possible which displays the no entry mark on the guide map as shown in FIG. 23 and FIG. 24, for example. In this case, it can also achieve the same advantage as that of the navigation system of the foregoing embodiment 12.

Embodiment 13

The navigation system of the embodiment 13 in accordance with the present invention is configured in such a manner as to conceal the HOV lane on the guide map, which is decided to be impassable according to the regulation. The configuration of the navigation system of the embodiment 13 in accordance with the present invention is the same as that of the navigation system of the foregoing embodiment 11. The following description will be made centering on differences (in operation) from the navigation system of the embodiment 11.

Figure 25:
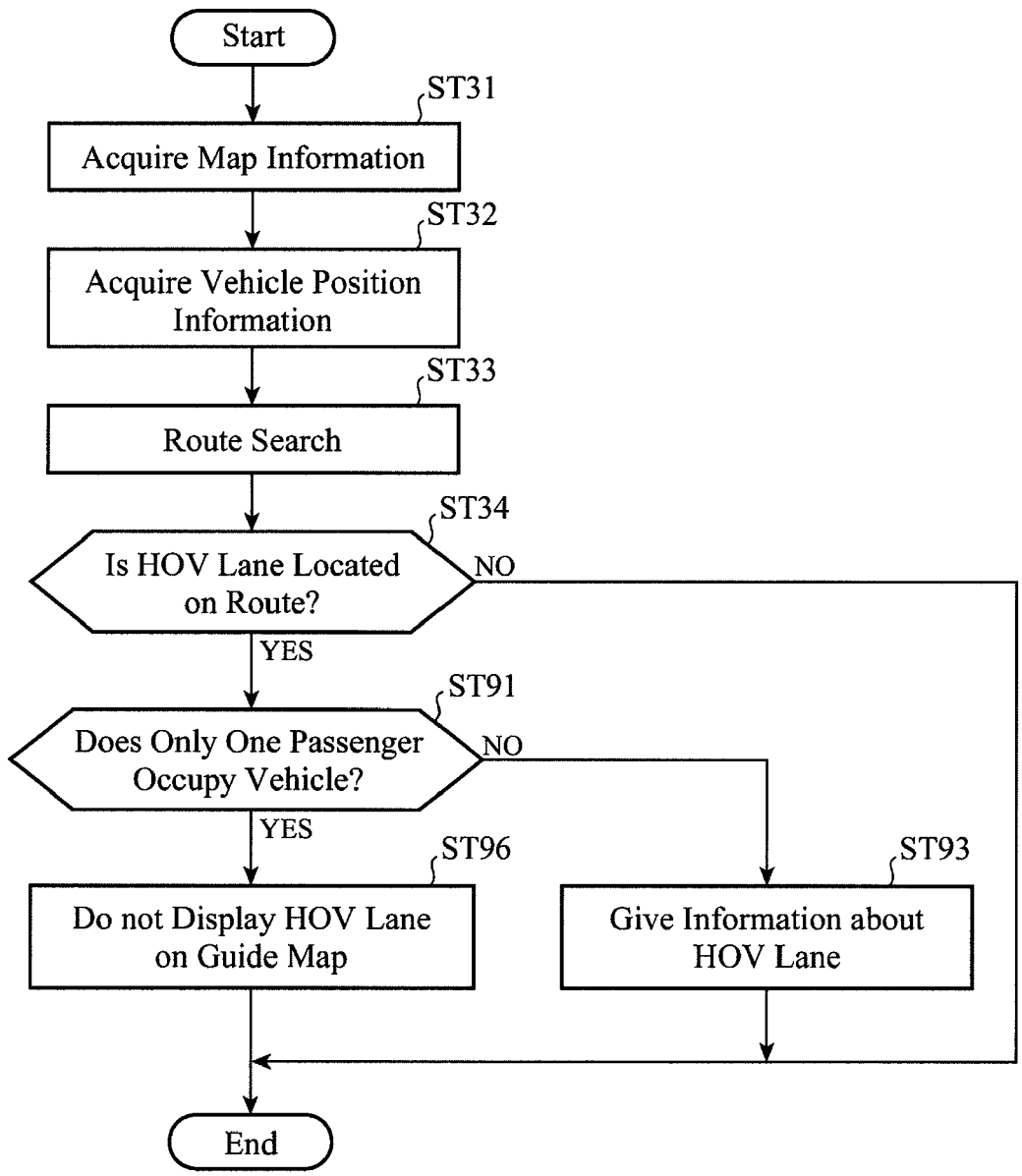
FIG. 25 is a flowchart showing the operation of a navigation system of an embodiment 13 in accordance with the present invention.

FIG. 25 is a flowchart showing the operation of the navigation system of the embodiment 13. Incidentally, steps executing the same or like processing to the processing in the flowcharts shown in FIG. 19 are designated by the same symbols as those of FIG. 19 to simplify the explanation.

In this processing, the map information is acquired, first (step ST31). Subsequently, the vehicle position information is acquired (step ST32). Subsequently, the route search is conducted (step ST33). Subsequently, it is checked whether the route has an HOV lane or not (step ST34). If a decision is made at this step ST34 that no HOV lane is located on the route, since it is not necessary to conceal the HOV lane, the processing is terminated.

On the other hand, if a decision is made at step ST34 that the HOV lane is located, then it is checked whether only one passenger is traveling in the vehicle or not (step ST91). If a decision is made at this step ST91 that only one passenger is traveling in the vehicle, then the HOV lane is not displayed on the guide map (step ST96). More specifically, the display processing unit 44 creates the display data in which the HOV lane is deleted from the guide map, and delivers to the display control unit 24 within the controller 20. The display control unit 24 converts the display data received to the video signal, and delivers to the display 18 via the input/output control unit 25. In this way, even if the HOV lane is located on the guide map displayed on the display 18 as shown in FIG. 26(*a*), for example, the HOV lane is deleted as shown in FIG. 26(*b*). After that, the processing is terminated.

On the other hand, if a decision is made at step ST91 that a plurality of passengers are in the vehicle rather than one, then the guidance associated with the HOV lane is performed (step ST93). More specifically, the control unit 30 controls in such a manner as to give information about the HOV lane as described above in the individual embodiments. After that, the processing is terminated.

As described above, according to the navigation system of the embodiment 13 in accordance with the present invention, since the vehicle cannot travel in the HOV lane when only one passenger is traveling in the vehicle, it does not display the HOV lane on the guide map because it is impassable. Thus, the user can drive in accordance with the information about the road displayed without being aware of the HOV lane.

Incidentally, although the navigation system of the foregoing embodiment 13 uses the occupant number as an example of the regulation, other regulation according to time or model can also be used.

Embodiment 14

The navigation system of an embodiment 14 in accordance with the present invention is configured in such a manner as to give information about a lane change at a suitable timing considering the presence/absence of the following vehicle at an entrance/exit section of the HOV lane. The configuration of the navigation system of the embodiment 14 in accordance with the present invention is the same as that of the navigation system of the foregoing embodiment 8. The following description will be made centering on differences (in operation) from the navigation system of the embodiment 8.

Figure 27:
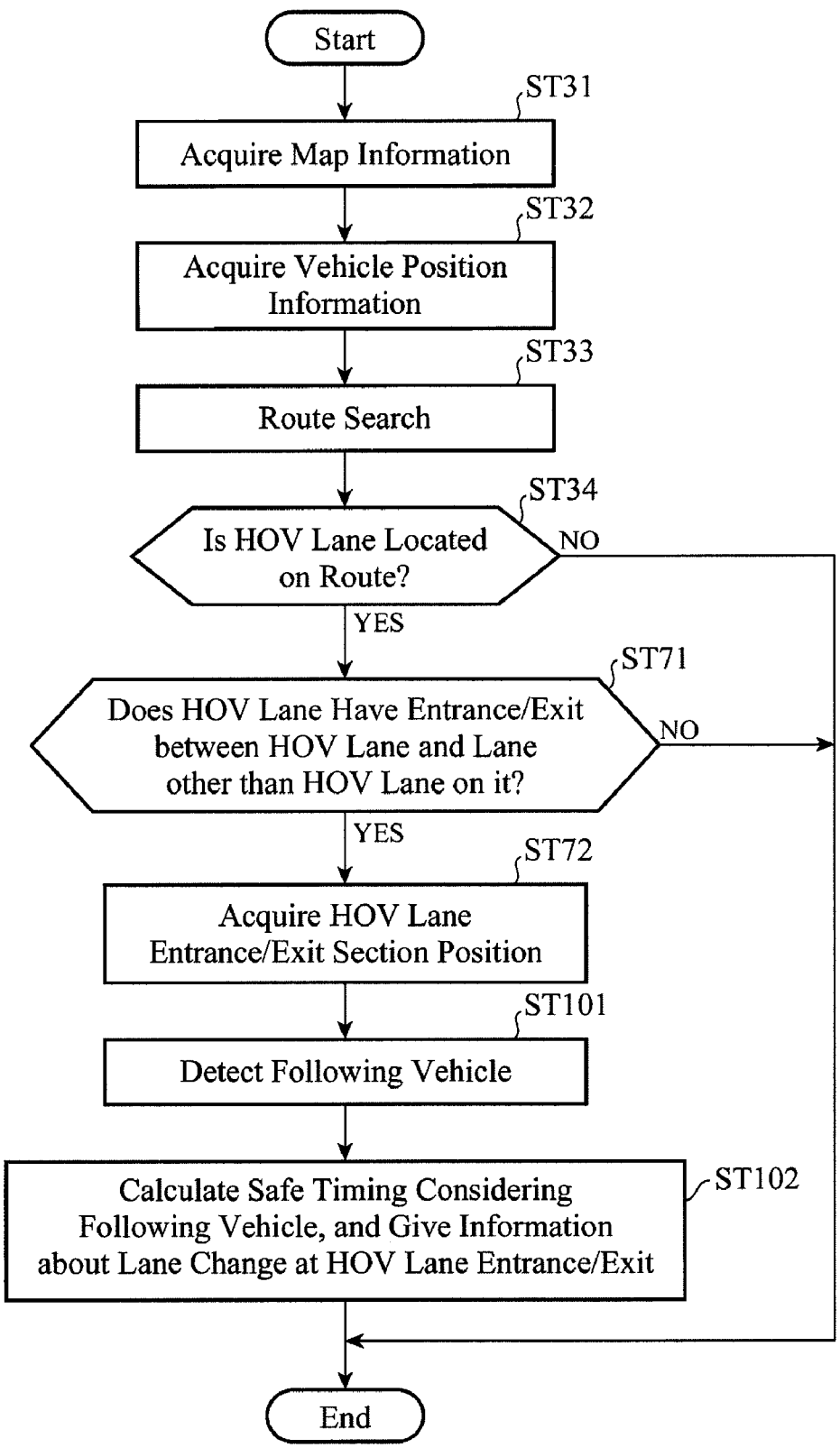
FIG. 27 is a flowchart showing the operation of a navigation system of an embodiment 14 in accordance with the present invention.

FIG. 27 is a flowchart showing the operation of the navigation system of the embodiment 14 centering on the lane change processing. Incidentally, steps executing the same or like processing to the processing in the flowchart shown in FIG. 15 are designated by the same symbols as those of FIG. 15 to simplify the explanation.

In the lane change processing, the map information is acquired, first (step ST31). Subsequently, the vehicle position information is acquired (step ST32). Subsequently, the route search is conducted (step ST33). Subsequently, it is checked whether the route has an HOV lane or not (step ST34). If a decision is made at this step ST34 that no HOV lane is located on the route, the lane change processing is terminated because the lane change between the HOV lane and another lane is not necessary.

On the other hand, if a decision is made at step ST34 that the HOV lane is located on the route, then it is checked whether an entrance/exit between the HOV lane and another lane is placed on the HOV lane (step ST71). More specifically, the HOV lane entrance/exit extracting unit 39 extracts, when the decision result acquired from the HOV lane decision unit 38 indicates that the route includes the HOV lane, an entrance/exit section between the lanes other than the HOV lane and the HOV lane, and delivers to the control unit 30. If a decision is made at this step ST71 that the entrance/exit between the HOV lane and another lane is not placed on the HOV lane, the entrance/exit information processing is terminated.

On the other hand, if a decision is made at step ST71 that the entrance/exit is placed between the HOV lane and another lane on the HOV lane, an HOV lane entrance/exit section position is acquired (step ST72). More specifically, the control unit 30 acquires, when the entrance/exit position data is delivered from the HOV lane entrance/exit extracting unit 39, the section indicated by the entrance/exit position data as the HOV lane entrance/exit section position.

Subsequently, detection of the following vehicle is performed (step ST101). More specifically, the following vehicle detecting unit 33 detects the presence/absence of the following vehicle on the basis of the following vehicle signal delivered from the following vehicle detecting sensor 16, and delivers the detection result to the control unit 30.

Subsequently, a safe timing considering the following vehicle is calculated, and the information is given about the lane change at the HOV lane entrance/exit (step ST102). More specifically, when a detection result that no following vehicle is present is delivered from the following vehicle detecting unit 33, the control unit 30 forms a message saying that it is a good timing for the lane change, and delivers it to at least one of the display processing unit 44 and voice message creating unit 45.

When the message is delivered from the control unit 30, the display processing unit 44 creates the display data for displaying the message, and delivers it to the display control unit 24 within the controller 20. The display control unit 24 converts the display data delivered from the display processing unit 44 to the video signal, and delivers to the display 18 via the input/output control unit 25. Thus, the message stating that it is the good timing for the lane change is displayed on the screen of the display 18.

In addition, the voice message creating unit 45 forms a voice message from the message saying that it is the good timing for the lane change delivered from the control unit 30, and delivers to the voice information unit 46 as the voice data. The voice information unit 46 converts the voice data delivered from the voice message creating unit 45 to the voice signal, and delivers to the voice output device 19. Thus, the voice output device 19 outputs the voice information indicating that it is the good timing for the lane change.

The display processing unit 44, display control unit 24, display 18, voice message creating unit 45, voice information unit 46 and voice output device 19 of the present embodiment 14 correspond to a guidance unit in accordance with the present invention.

As described above, according to the navigation system of the embodiment 14 in accordance with the present invention, since it gives information about the good timing for the lane change in accordance with the presence/absence of the following vehicle, the user can perform safe driving comfortably.

Embodiment 15

The navigation system of an embodiment 15 in accordance with the present invention is configured in such a manner as to give information by deciding the passable/impassable state of an HOV lane in accordance with the vehicle information. The configuration of the navigation system of the embodiment 15 in accordance with the present invention is the same as that of the navigation system of the foregoing embodiment 8. The following description will be made centering on differences (in operation) from the navigation system of the embodiment 8.

Figure 28:
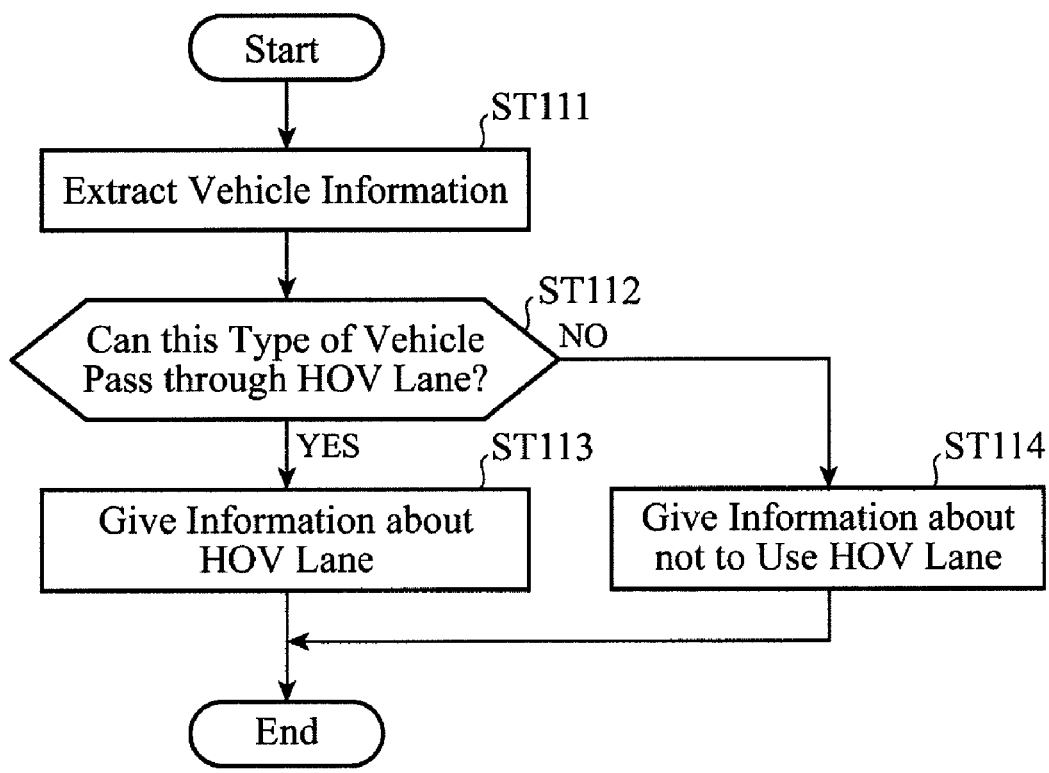
FIG. 28 is a flowchart showing the operation of a navigation system of an embodiment 15 in accordance with the present invention.

FIG. 28 is a flowchart showing the operation of the navigation system of the embodiment 15 centering on the information processing.

In the information processing, vehicle information is extracted, first (step ST111). More specifically, the vehicle information extracting unit 35 extracts the vehicle information on the vehicle such as that indicating the dimensions of the vehicle (large-sized/medium-sized) from the vehicle in which the navigation system is mounted, and delivers to the control unit 30.

Subsequently, the type of the vehicle is checked whether it can pass through the HOV lane (step ST112). More specifically, when the HOV lane decision unit 38 decides that the road indicated by the map information acquired from the map information acquiring unit 31 includes the HOV lane, the control unit 30 checks whether the vehicle with the type indicated by the vehicle information acquired at step ST111 is passable through the HOV lane or not.

If a decision is made at this step ST112 that it is a vehicle passable through the HOV lane, then the information is given about the HOV lane (step ST113). More specifically, the control unit 30 carries out control in such a manner as to give information about the HOV lane as described in the individual embodiments described above. More specifically, the control unit 30 forms a message for guidance of the HOV lane, and delivers it to at least one of the display processing unit 44 and voice message creating unit 45.

When the message is delivered from the control unit 30, the display processing unit 44 creates the display data for displaying the message, and delivers to the display control unit 24 within the controller 20. The display control unit 24 converts the display data delivered from the display processing unit 44 to the video signal, and delivers it to the display 18 via the input/output control unit 25. Thus, the message for guidance of the HOV lane is displayed on the screen of the display 18, for example.

In addition, the voice message creating unit 45 forms a voice message from the message guidance of the HOV lane delivered from the control unit 30, and delivers it to the voice information unit 46 as the voice data. The voice information unit 46 converts the voice data delivered from the voice message creating unit 45 to the voice signal, and delivers it to the voice output device 19. Thus, the voice output device 19 outputs the voice information about the HOV lane. After that, the processing is terminated.

On the other hand, if a decision is made at step ST112 that the vehicle is impassable through the HOV lane, then ordinary information is given without considering the HOV lane (step ST114). More specifically, the control unit 30 controls in such a manner as to perform ordinary guidance without guidance of the HOV lane. More specifically, the control unit 30 forms a message for giving ordinary guidance without considering the HOV lane, and delivers it to at least one of the display processing unit 44 and voice message creating unit 45.

When the message is delivered from the control unit 30, the display processing unit 44 creates the display data for displaying the message, and delivers to the display control unit 24 within the controller 20. The display control unit 24 converts the display data delivered from the display processing unit 44 to the video signal, and delivers it to the display 18 via the input/output control unit 25. To be concrete, the message for guidance of not using the HOV lane is displayed on the screen of the display 18.

In addition, the voice message creating unit 45 forms a voice message from the message giving ordinary information without considering the HOV lane delivered from the control unit 30, and delivers it to the voice information unit 46 as the voice data. The voice information unit 46 converts the voice data delivered from the voice message creating unit 45 to the voice signal, and delivers it to the voice output device 19. Thus, the voice output device 19 outputs the voice information that the HOV lane is unavailable, that is, the ordinary information without considering the HOV lane. After that, the processing is terminated.

The display processing unit 44, display control unit 24, display 18, voice message creating unit 45, voice information unit 46 and voice output device 19 of the present embodiment 15 correspond to the a guidance unit in accordance with the present invention.

As described above, according to the navigation system of the embodiment 15 in accordance with the present invention, since there is a road as to which the passableness of the HOV lane is decided depending on the vehicle, guidance considering the vehicle enables the user to drive comfortably in accordance with the guidance.

Embodiment 16

The navigation system of an embodiment 16 in accordance with the present invention is configured in such a manner as not to give information about a branch road diverging only from an ordinary lane in a route section passing through an HOV lane. The configuration of the navigation system of the embodiment 16 in accordance with the present invention is the same as that of the navigation system of the foregoing embodiment 8. The following description will be made centering on differences (in operation) from the navigation system of the embodiment 8.

Figure 29:
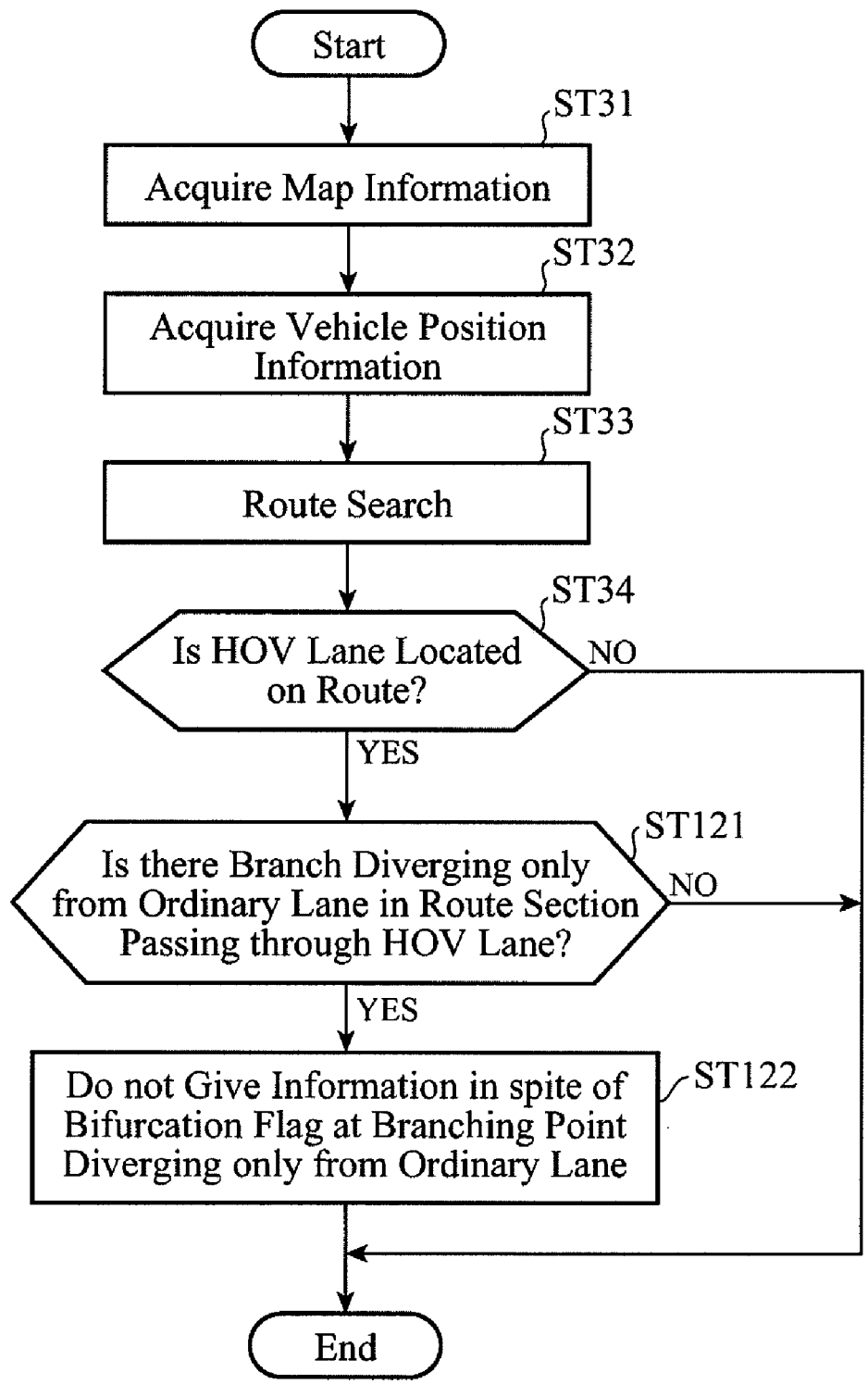
FIG. 29 is a flowchart showing the operation of a navigation system of an embodiment 16 in accordance with the present invention.

FIG. 29 is a flowchart showing the operation of the navigation system of the embodiment 16 centering on branch road information processing. Incidentally, steps executing the same or like processing to the processing in the flowchart shown in FIG. 15 are designated by the same symbols as those of FIG. 15 to simplify the explanation. Here, the branch road information processing makes a decision as to: (a) whether to give information about a branch road or not; (b) whether to adopt it as a target of a guidance display or not; and (c) whether to adopt it as a target of the voice information or not.

In the branch road information processing, the map information is acquired, first (step ST31). Subsequently, the vehicle position information is acquired (step ST32). Subsequently, the route search is conducted (step ST33). Subsequently, it is checked whether the route has an HOV lane or not (step ST34). If a decision is made at this step ST34 that no HOV lane is located, since it is not necessary to consider an ordinary lane running side by side with an HOV lane, the branch road information processing is terminated.

On the other hand, if a decision is made at step ST34 that the HOV lane is located on the route, then it is checked whether there is a branch road diverging only from an ordinary lane in the route section passing through the HOV lane or not (step ST121). More specifically, the control unit 30 checks whether there is a branch road diverging only from the ordinary lane in the route section passing through the HOV lane on the basis of the map information acquired from the map information acquiring unit 31. If a decision is made at this step ST121 that there is not a branch road diverging only from the ordinary lane in the route section passing through the HOV lane, then the branch road information processing is terminated.

On the other hand, if a decision is made at step ST121 that there is a branch road diverging only from the ordinary lane in the route section passing through the HOV lane, even if a bifurcation flag (which indicates that guidance is necessary without exception) is set at a fork where the branch road diverges only from the ordinary lane, the information is not given (step ST122). More specifically, the control unit 30 does not execute the processing for guidance. After that, the branch road information processing is terminated.

As described above, according to the navigation system of the embodiment 16 in accordance with the present invention, as for the branch road connected to the ordinary lane, since it is impossible to enter the branch road during driving in the HOV lane, it can suppress unnecessary guidance for a user.

Embodiment 17

The navigation system of an embodiment 17 in accordance with the present invention is configured in such a manner as not to give information about a branch road diverging only from an HOV lane in a route section passing through an ordinary lane. The configuration of the navigation system of the embodiment 17 in accordance with the present invention is the same as that of the navigation system of the foregoing embodiment 8. The following description will be made centering on differences (in operation) from the navigation system of the embodiment 8.

Figure 30:
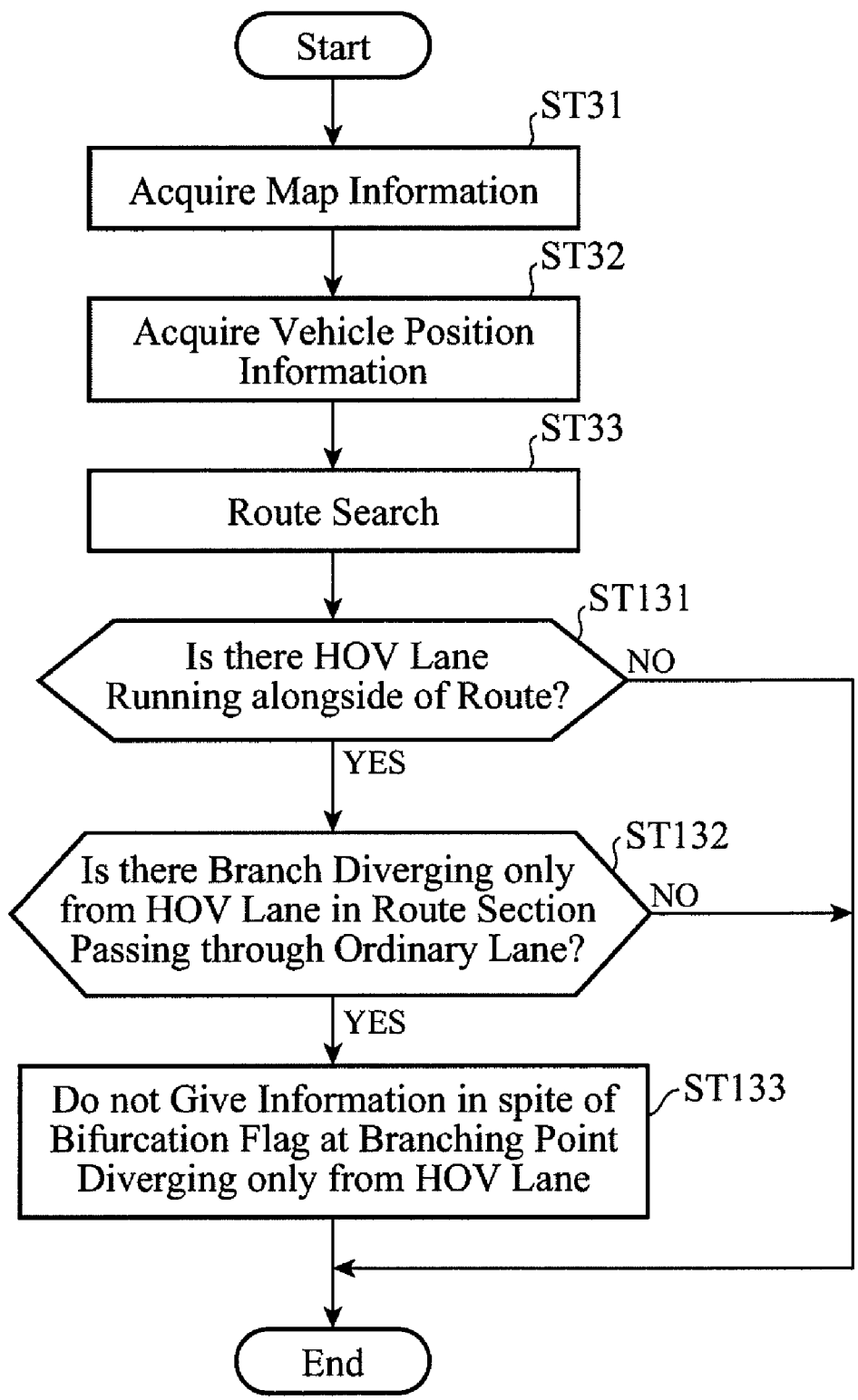
FIG. 30 is a flowchart showing the operation of a navigation system of an embodiment 17 in accordance with the present invention.

FIG. 30 is a flowchart showing the operation of the navigation system of the embodiment 17 centering on branch road information processing. Incidentally, steps executing the same or like processing to the processing in the flowchart shown in FIG. 15 are designated by the same symbols as those of FIG. 15 to simplify the explanation. Here, the branch road information processing makes a decision as to: (a) whether to give information about a branch road or not; (b) whether to adopt it as a target of a guidance display or not; and (c) whether to adopt it as a target of the voice information or not.

In the branch road information processing, the map information is acquired, first (step ST31). Subsequently, the vehicle position information is acquired (step ST32). Subsequently, the route search is conducted (step ST33). Subsequently, it is checked whether the route has an HOV lane running alongside the route or not (step ST131). More specifically, the control unit 30 acquires the route data from the route storage unit 37 and decides whether there is an HOV lane running alongside the route indicated by the route data. If a decision is made at this step ST131 that no HOV lane is located which runs alongside the route, since it is not necessary to consider an HOV lane running side by side with an ordinary lane, the branch road information processing is terminated.

On the other hand, if a decision is made at step ST131 that the HOV lane which runs alongside the route is located, then it is checked whether there is a branch road diverging only from the HOV lane in the route section passing through the ordinary lane or not (step ST132). More specifically, the control unit 30 checks whether there is a branch road diverging only from the HOV lane in the route section passing through the ordinary lane on the basis of the map information acquired from the map information acquiring unit 31. If a decision is made at this step ST132 that there is not a branch road diverging only from the HOV lane in the route section passing through the ordinary lane, then the branch road information processing is terminated.

On the other hand, if a decision is made at step ST132 that there is a branch road diverging only from the HOV lane in the route section passing through the ordinary lane, even if a bifurcation flag is set at a fork where the branch road diverges only from the HOV lane, the information is not given (step ST133). More specifically, the control unit 30 does not execute the processing for guidance. After that, the branch road information processing is terminated.

As described above, according to the navigation system of the embodiment 17 in accordance with the present invention, as for the branch road connected only to the HOV lane, since it is impossible to enter the branch road during driving in the ordinary lane, it can suppress unnecessary guidance for a user.

Embodiment 18

The navigation system of an embodiment 18 in accordance with the present invention is configured in such a manner as not to give information about a branch road diverging only from an HOV lane in a route section passing through an ordinary lane. The configuration of the navigation system of the embodiment 18 in accordance with the present invention is the same as that of the navigation system of the foregoing embodiment 8. The following description will be made centering on differences (in operation) from the navigation system of the embodiment 8.

Figure 31:
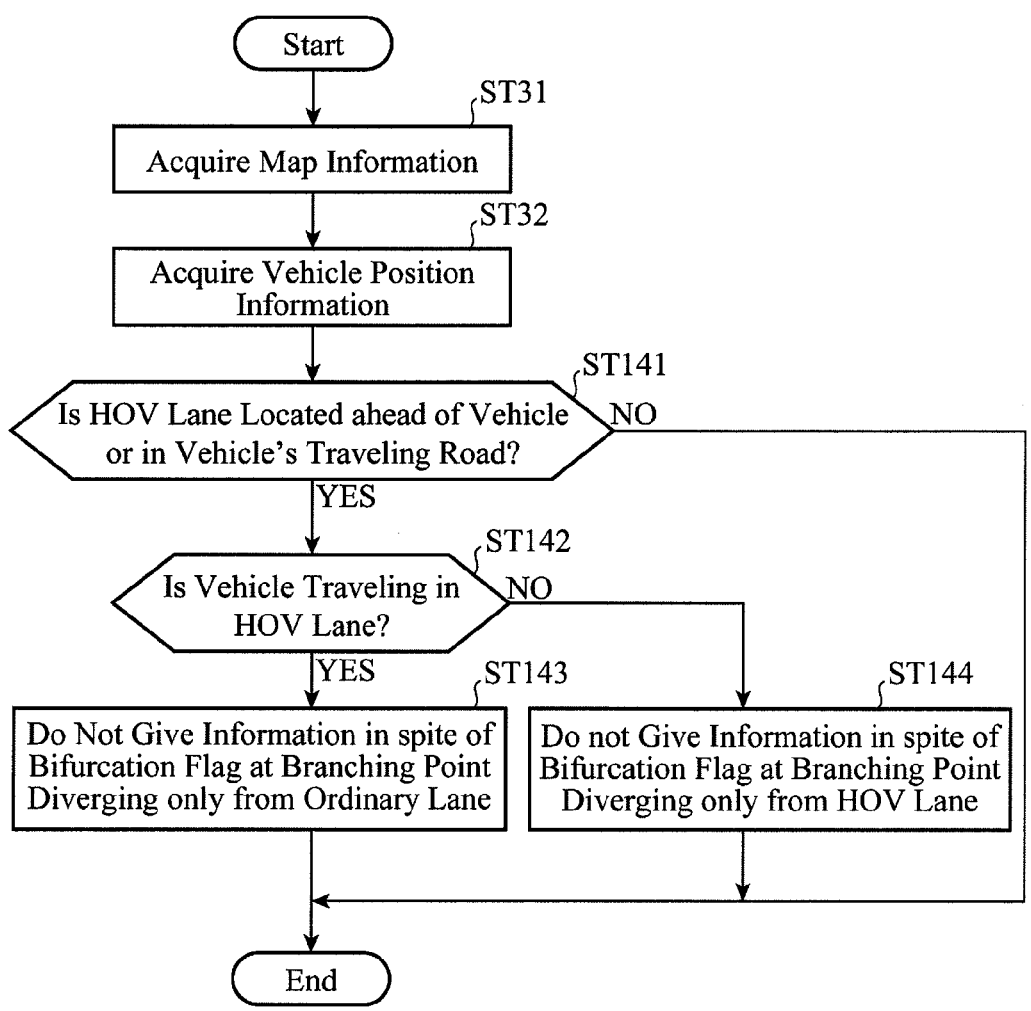
FIG. 31 is a flowchart showing the operation of a navigation system of an embodiment 18 in accordance with the present invention.

FIG. 31 is a flowchart showing the operation of the navigation system of the embodiment 18 centering on branch road information processing. Incidentally, steps executing the same or like processing to the processing in the flowchart shown in FIG. 15 are designated by the same symbols as those of FIG. 15 to simplify the explanation. Here, the branch road information processing makes a decision as to: (a) whether to give information about a branch road or not; (b) whether to adopt it as a target of a guidance display or not; and (c) whether to adopt it as a target of the voice information or not.

In the branch road information processing, the map information is acquired, first (step ST31). Subsequently, the vehicle position information is acquired (step ST32). Subsequently, it is checked whether an HOV lane is located ahead of the vehicle or on the vehicle's traveling road (step ST141). More specifically, the control unit 30 checks whether an HOV lane is located on the road ahead of the vehicle indicated by the map information acquired from the map information acquiring unit 31 or in the road in which the vehicle is traveling on the basis of the current position acquired from the current position detecting unit 32. If a decision is made at this step ST141 that no HOV lane is located ahead of the vehicle or on the vehicle's traveling road, since it is not necessary to consider the HOV lane, the branch road information processing is terminated.

On the other hand, if a decision is made at step ST141 that the HOV lane is located ahead of the vehicle or on the vehicle's traveling road, then it is checked whether the vehicle is traveling in the HOV lane or not (step ST142). More specifically, the control unit 30 checks whether the current position acquired from the current position detecting unit 32 is on the HOV lane which is decided as being located at step ST141.

If a decision is made at this step ST142 that the vehicle is traveling in the HOV lane, then the information is not given even if the bifurcation flag is set at a fork diverging only from the ordinary lane (step ST143). More specifically, the control unit 30 does not execute the processing for guidance. After that, the branch road information processing is terminated.

On the other hand, if a decision is made at this step ST142 that the vehicle is not traveling in the HOV lane, then the information is not given even if the bifurcation flag is set at a fork diverging only from the HOV lane (step ST144). More specifically, the control unit 30 does not execute the processing for guidance. After that, the branch road information processing is terminated.

As described above, according to the navigation system of the embodiment 18 in accordance with the present invention, as for the branch road connected to the ordinary lane, since it is impossible to enter the branch road during driving in the HOV lane, it can suppress unnecessary guidance for a user. Likewise, as for the branch road connected to the HOV lane, since it is impossible to enter the branch road during driving in the ordinary lane, it can suppress unnecessary guidance for a user.

INDUSTRIAL APPLICABILITY

A navigation system in accordance with the present invention can enable a user to visually recognize in which road the user is driving when a decision is made that a road indicated by map information includes an HOV lane. Accordingly, it is suitable for an application to a navigation system for guiding the user to a destination via a route including an HOV lane.

What is claimed is:

1. A navigation system comprising:
a map information acquiring unit for acquiring map information;
an HOV lane decision unit for deciding whether an HOV lane is included in a road represented by the map information acquired by the map information acquiring unit or not;
an HOV lane entrance/exit extracting unit for extracting, when the HOV lane decision unit decides that the HOV lane is included, an entrance/exit section between a lane other than the HOV lane and the HOV lane;
a following vehicle detecting unit for detecting presence or absence of a following vehicle traveling in a lane which is adjacent to a current lane and to which a lane change is to be made; and
a guidance unit for giving information in accordance with the presence or absence of the following vehicle detected by the following vehicle detecting unit in the HOV lane entrance/exit section extracted by the HOV lane entrance/exit extracting unit.

2. A navigation system comprising:
a map information acquiring unit for acquiring map information;
an HOV lane decision unit for deciding whether an HOV lane is included in a road represented by the map information acquired by the map information acquiring unit or not;
a vehicle information extracting unit for extracting vehicle information including information indicating a type or a size of a vehicle;
a control unit for making a passable/impassable decision of the HOV lane from the vehicle information extracted by the vehicle information extracting unit when the HOV lane decision unit decides that the HOV lane is included; and
a guidance unit for giving information in accordance with the passable/impassable decision about the HOV lane made by the control unit.

* * * * *